(12) United States Patent
Hobby et al.

(10) Patent No.: US 9,949,299 B2
(45) Date of Patent: *Apr. 17, 2018

(54) EMERGENCY RADIO COMMUNICATIONS SYSTEM INCORPORATING INTEGRAL PUBLIC SAFETY RADIO BRIDGING CAPABILITY

(71) Applicant: SAFECOM 911, INC., Centennial, CO (US)

(72) Inventors: Patrick L. Hobby, Highlands Ranch, CO (US); David E. Petty, Loveland, CO (US)

(73) Assignee: SAFECOM 911, INC., Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/642,631

(22) Filed: Jul. 6, 2017

(65) Prior Publication Data

US 2017/0311358 A1    Oct. 26, 2017

Related U.S. Application Data

(63) Continuation of application No. 15/445,868, filed on Feb. 28, 2017, and a continuation of application No.
(Continued)

(51) Int. Cl.
*H04W 76/00* (2018.01)
*H04L 29/06* (2006.01)
*H04W 4/22* (2009.01)

(52) U.S. Cl.
CPC ........... *H04W 76/007* (2013.01); *H04L 69/16* (2013.01); *H04W 4/22* (2013.01)

(58) Field of Classification Search
CPC ........ H04W 76/007; H04W 4/22; H04L 69/16
(Continued)

(56) References Cited

U.S. PATENT DOCUMENTS 2,103,857 A   12/1937  Lindsey
3,401,234 A    9/1968  Heald
(Continued)

OTHER PUBLICATIONS

"Guide to Radio Communications Interoperability Strategies and Products", Agile Report No. TE-02-02, Mar. 24, 2003, 43 pages.
(Continued)

*Primary Examiner* — Michael Neff
(74) *Attorney, Agent, or Firm* — Berg Hill Greenleaf & Ruscitti LLP

(57) ABSTRACT

A communication system and method is provided for handling emergencies wherein public safety radios are used to directly communicate with normally incompatible radios used by organizations such as schools. The system includes a radio communication bridge that is selectively activated by emergency personnel to contact an organization undergoing an emergency. The bridge is activated via a TCP/IP command over an IP network or alternatively sent by a preprogrammed digital radio. Computer software or firmware at communication endpoints, emergency responder locations, and at an emergency call center facilitates functionality of the system to include emergency notifications, dissemination of information associated with a particular emergency, and the status of the system to include activation and deactivation of the radio bridge.

25 Claims, 18 Drawing Sheets

Related U.S. Application Data

15/099,430, filed on Apr. 14, 2016, now Pat. No. 9,736,867, which is a continuation-in-part of application No. 14/594,993, filed on Jan. 12, 2015, now Pat. No. 9,414,214, which is a continuation-in-part of application No. 12/901,993, filed on Oct. 11, 2010, now Pat. No. 8,934,934, which is a continuation-in-part of application No. 12/141,849, filed on Jun. 18, 2008, now Pat. No. 7,813,750, which is a continuation-in-part of application No. 11/682,231, filed on Mar. 5, 2007, now abandoned.

(58) Field of Classification Search
USPC .................................................. 455/404.1
See application file for complete search history.

(56) References Cited

U.S. PATENT DOCUMENTS

| | | |
|---|---|---|
| 3,701,024 A | 10/1972 | Knowles et al. |
| 3,914,692 A | 10/1975 | Seaborn, Jr. |
| 3,991,282 A | 11/1976 | Feil |
| 4,092,643 A | 5/1978 | Stolarczyk |
| 4,559,526 A | 12/1985 | Tani et al. |
| 4,652,859 A | 3/1987 | Van Wienen |
| 4,670,739 A | 6/1987 | Kelly, Jr. |
| 4,926,496 A | 5/1990 | Cole et al. |
| 5,121,430 A | 6/1992 | Ganzer et al. |
| 5,444,433 A | 8/1995 | Gropper |
| 5,483,218 A | 1/1996 | Roosa |
| 5,487,149 A | 1/1996 | Sung |
| 5,497,149 A | 3/1996 | Fast |
| 5,509,054 A | 4/1996 | Garland |
| 5,563,931 A | 10/1996 | Bishop et al. |
| 5,889,474 A | 3/1999 | LaDue |
| 5,955,947 A | 9/1999 | Sutsos et al. |
| 5,960,337 A | 9/1999 | Brewster et al. |
| 6,240,285 B1 | 5/2001 | Blum et al. |
| 6,272,120 B1 | 8/2001 | Alexander |
| 6,369,707 B1 | 4/2002 | Neer |
| 6,377,172 B1 | 4/2002 | Neer |
| 6,418,216 B1 | 7/2002 | Harrison et al. |
| 6,687,339 B2 | 2/2004 | Martin |
| 6,766,159 B2 | 7/2004 | Lindholm |
| 6,876,858 B1 | 4/2005 | Duvall et al. |
| 7,148,797 B2 | 12/2006 | Albert |
| 7,212,111 B2 | 5/2007 | Tupler et al. |
| 7,340,239 B2 | 5/2008 | Laatu |
| 7,580,706 B2 | 8/2009 | Koren et al. |
| 7,676,228 B2 | 3/2010 | Olivier et al. |
| 7,813,750 B2 | 10/2010 | Hobby et al. |
| 8,934,934 B1 * | 1/2015 | Hobby .................. H04W 92/02 370/401 |
| 8,989,735 B1 | 3/2015 | Oo |
| 2002/0080025 A1 | 6/2002 | Beattie |
| 2002/0131397 A1 | 9/2002 | Patel et al. |
| 2005/0170808 A1 | 8/2005 | Hamilton |
| 2005/0170819 A1 | 8/2005 | Barclay et al. |
| 2005/0221794 A1 | 10/2005 | Grosser et al. |
| 2005/0267651 A1 | 12/2005 | Arango et al. |
| 2006/0019655 A1 | 1/2006 | Peacock |
| 2006/0046697 A1 | 3/2006 | Koren et al. |
| 2006/0080344 A1 | 4/2006 | McKibben et al. |
| 2007/0232293 A1 | 10/2007 | Goldman et al. |
| 2008/0037461 A1 | 2/2008 | Blitz et al. |
| 2008/0167062 A1 | 7/2008 | Gilbert et al. |
| 2008/0220801 A1 | 9/2008 | Hobby et al. |
| 2008/0274761 A1 | 11/2008 | Block et al. |
| 2015/0147996 A1 | 5/2015 | Hobby et al. |
| 2016/0234869 A1 * | 8/2016 | Hobby ................... H04W 4/22 |
| 2017/0188396 A1 * | 6/2017 | Hobby ................ H04W 76/007 |

OTHER PUBLICATIONS

Mayer-Schonberger, "The politics of public safety communication interoperability regulation", Telecommunications Policy 29, 2005, pp. 831-842.

"Northern Virginia Traffic Operations Center", Virginia Department of Transportation Webpage, available at http//www.virginiadot.org/travel/smart-traffic-center-nova.asp, Oct. 29, 2006 (from Internet Archive), 1 page.

"Reginal Traffic Center Operations Center Opens", Monroe County (New York) Regional Traffic Operations Center Webpage, available at http://www.monroecounty.gov/dot-rtoc.php, May 2002, 2 pages.

* cited by examiner

| Administrator | 280 |
|---|---|

Site Information

| | |
|---|---|
| Server Setup | |
| Districts | |
| Site List | |
|    Edit Site | |
|    Recent Alert Log | |
|    Archived Alert Log | |
| License Users | |
| Notification Users | |
| Flag List | |
| Selection Groups | |
| Single Site Report | |
| Multi Site Report | |

| | |
|---|---|
| Status | ☑ Active |
| Site Name | Academy Charter School |
| Tagline | 284    282 |
| District | Douglas County School District No Re 1 ▽ |
| Logging | ☐ Log Radio Activity (SAT6052) |
| Address1 | 1551 Prairie Hew |
| Address2 | |
| City | Castle Rock |
| State | Co |
| Zip | 80104 |
| Phone | 3036604881 |
| IP Address | |
| Command Port | 10001 |
| Mode | ◉ Mode 1 : 2CH Being Used as 2CH<br>   ☐ Mutually Exclusive<br>○ Mode 2 : 2CH Being Used as 1CH for 911<br>○ Mode 3 : 2CH Being Used as 1CH for SEC<br>○ Mode 4 : 1CH Elementary for 911<br>○ Mode 5 : 1CH Elementary for SEC<br>○ Future Site |
| Local AD Override | ☑ (this school Only) |
| Show AD | If Bridged ○    Always ○ |

FIG. 21

EMERGENCY RADIO COMMUNICATIONS SYSTEM INCORPORATING INTEGRAL PUBLIC SAFETY RADIO BRIDGING CAPABILITY

CROSS REFERENCE TO RELATED APPLICATIONS

This application is a continuation of application Ser. No. 15,445,868 filed on Feb. 28, 2017, and a continuation of application Ser. No. 15,099,430 filed on Apr. 14, 2016, which is a continuation-in-part of application Ser. No. 14/594,993 filed on Jan. 12, 2015, now U.S. Pat. No. 9,414,214, which is a continuation-in-part of application Ser. No. 12/901,993 filed on Oct. 11, 2010, now U.S. Pat. No. 8,934,934, which is a continuation-in-part of application Ser. No. 12/141,849 filed on Jun. 18, 2008, now U.S. Pat. No. 7,813,750, which is a continuation-in-part of application Ser. No. 11/682,231 filed on Mar. 5, 2007, the entire disclosures of which are hereby incorporated by reference.

FIELD OF THE INVENTION

The present invention relates to communication systems incorporating multiple communication modes, and more particularly, to an emergency communication system for bridging incompatible radio communication elements.

BACKGROUND OF THE INVENTION

Many organizations have internal radio systems to manage day-to-day operations to include organization security. Various staff or security personnel may be equipped with radios enabling basic two-way communications between personnel. For many years, emergency or first responders such as law enforcement and fire departments have used radios for communications.

Because of the required range and necessity for reliability, government officials communicating by radio are typically equipped with highly advanced radio systems that are unable to directly communicate with the less complex radio systems used by organizations. When there is an emergency incident occurring at an organization, the standard method to contact emergency responders is by a telephone call to 911. A 911-call center is able to obtain the location of the caller in order to dispatch emergency responders. However, emergency responders have no direct means of radio communication with personnel located at the emergency location. Regardless of the nature of the incident and the identity of the emergency responders, it is very difficult for organizational personnel to directly speak with the responders prior to the responders arriving at the location.

Many emergency situations are time critical and the ability for organizational personnel to provide instantaneous information as to the status of the emergency can make the difference between emergency responders properly handling the situation as opposed to such responders not having adequate information, and the emergency situation then turning into a tragedy. No matter the type of emergency situation, the ability to provide accurate and timely information by those directly affected by the emergency situation often results in a more complete and rapid response by emergency responders.

Emergency responders typically have two-way radios installed in their vehicles to allow rapid and reliable communication between these emergency responders and their dispatch center or PSAP to control and coordinate their emergency actions. Many police officers and firemen also carry hand held radios that operate on the same radio system. Because of the necessity to ensure that emergency responders have the ability to communicate with one another, Federal regulations limit the types of organizations that may operate on the same frequency bands as emergency personnel. As mentioned above with respect to organizations who use two-way radio systems for daily operations, these radio systems are not able to communicate with emergency radio systems since each operate on very distinct frequencies, and the nature of the RF signals produced during the communications are very different. Therefore, other than the 911 telecommunications, affected personnel at the organization cannot communicate with emergency responders until they arrive at the scene.

Therefore, there is a need for a system and method whereby direct communications can be facilitated between emergency responders and affected organizational personnel during emergency situations. Additionally, there is need to provide a communication system where organizations can avoid the expense of purchasing more sophisticated and expensive radio communication systems, and the ability to directly communicate with emergency personnel can be on a selective and controlled basis. Additionally, there is a need to provide a communication system that may timely inform a network or group of organizations regarding an emergency situation coupled with the ability of a 911 call center to select which organizations within the group can directly communicate with selected emergency response personnel.

SUMMARY OF THE INVENTION

In accordance with the present invention, a communication system and method is provided for handling emergency situations wherein complex public safety radio systems can be used to directly communicate with normally incompatible radio systems used by organizations such as schools, hospitals, and other large independent facilities. The system of the present invention includes a radio communication patch or bridge that is selectively activated by emergency personnel to contact one or more selected organizations. In a preferred embodiment of the present invention, the communication system further includes a communication network, such as a local area network (LAN) or a group of LANs and a high speed interconnecting network such as the Internet. Activation and deactivation of the bridge is achieved over the LAN(s). A computer server may be located at one of several locations such as at a 911 call center, school district headquarters, or school district security center. This server is used to monitor and control the emergency communication system with one or more communication endpoints that are linked to the server. Each of the communication endpoints, such as separate schools, each have an IP address that allows them to be connected over the network(s) by the server. Each of the communication endpoints also has their own local two-way radio system and a communication patch or bridge device that is activated or enabled by IP commands over the network(s). Activation of the bridge is typically prompted by a 911 call by the affected organization at the communication end point. The 911-call center then evaluates the particular emergency, and can selectively activate over the network(s) the radio bridge. Once the bridge is activated, personnel located at the communication end point can then directly communicate with the emergency responders who have been dispatched and who are operating their radios on the public safety radio system. The local radios at the communication endpoints operate on their normal frequency/channel and once the bridge is activated then the local radios are automatically merged with the public safety radio channel or talk group. When the bridge is deactivated, the radios cease to operate on the public safety radio frequency/channel and are automatically returned to their normal channel operation.

Functionality of the system is achieved through computer software or firmware installed at the 911-call center, at the location of the emergency responders, and at each communication end point. This software/firmware is used to facilitate a number of functions to include a communication tool wherein upon notification of an emergency, emergency instructions can be conveyed to each of the communication endpoints. A user having the requisite bridge activation/deactivation authority can control the communications bridge(s) established as well as emergency instructions. These instructions can be conveyed in the form of email messages coupled with audio and/or visual alarms that are triggered by designated types of email messages.

Two particular features of the system include a Channel Take Over feature and an Audio Detect feature. Bridging remote radio systems will always give rise to simultaneous radio frequency (RF) collisions or interferences caused by the simultaneous transmission of messages by radio users at separate locations. Such collisions are common, particularly in larger public safety systems, sometimes referred to wide area systems.

Since radio users at remote locations are unable to see the physical actions of other parties who may be on the same bridged radio network, the RF collisions can disrupt meaningful communications for significant time periods. With some radio etiquette training, to include use of proper call announcements and acknowledgments, more successful communication exchanges can be conducted over wide area systems. The determination of which radio user may transmit and which radio user may listen at any particular time is normally a function of the first party to transmit. Most two-way radio systems carry specifications for transmitter "up time" and receiver sensitivity. These radio specifications are usually measured in milliseconds, and determine which user is able to transmit; accordingly all the other users on the channel at that time are forced to listen. For example, if ten radio users are on a particular radio channel and one user presses the transmitter button on their radio first while there is at least some incremental break in transmissions from other users, then the other nine users are unable to transmit and are forced to listen to the first user's radio transmission. Despite using proper radio protocol, wide area systems may be much more prone to continual RF collisions. These collisions can complicate efforts of dispatchers and emergency responders to effectively communicate with local radio users. While wide area systems have the capability to bridge a great number of remote locations, as large as a city, county, or entire state, there are resulting performance impacts that degrade the ability to prevent RF collisions. Specifically, there is degradation in overall system recognition of first to transmit signals, thereby resulting in additional occurrences of RF collisions.

One can also appreciate that in an emergency situation, even the most trained radio users may not perform proper radio protocol, resulting in very inefficient radio communication in which RF collisions significantly impede the ability for timely and clear communications.

Therefore, there is a need to provide a solution, particularly for wide area systems, to reduce RF collisions. The Channel Take Over feature of the present invention provides a solution to this RF collision or interference problem. The Channel Take Over feature involves a password controlled feature for each remote user interface or selected remote user interfaces. When activated, this feature will detach or disengage the bridge function at any or all selected locations for a pre-determined period of time, such as measured in seconds. The user who activates this feature will then have this pre-determined period of time or take over period to begin transmitting, and during which time will lead the flow of communications over the radio network. Accordingly, all previously bridged users will be required to listen to the transmission during the takeover period. However, the Channel Take Over feature cannot detach or disengage a user with an analog type radio transmitter who may be transmitting simultaneous with activation of the Channel Take Over feature. In this instance, in order to interrupt and takeover the previously transmitting remote radio location, the system of the present invention selectively generates a much higher power radio signal from the user activating the Channel Take Over feature, thereby instantly causing interference with the previously transmitting radio user until the user ceases transmitting and starts receiving.

With respect to the Audio Detect feature, a user interface screen may provide the user with a visual indication as to which particular remote location is transmitting at that time. For example, an icon can be displayed next to the listing of the remote location, and indicating whether or not radio transmissions are occurring. The user interface screen may also display which location is asserting its Channel Take Over authority at any particular time.

With the Channel Take Over and Audio Detect features, not only is some hierarchy or priority provided for users such as dispatch centers or emergency responders, but a visual user interface is provided to all users within the system which will inherently assist in managing the flow of radio communications to prevent unnecessary radio transmissions.

Another feature of the invention includes tracking and evaluating radio communications at selected communication endpoints to determine whether personnel at the communication endpoint are effectively utilizing the communication system. This tracking feature is enabled by the Audio Detect feature in which an administrator or evaluator of the communication system may wish to evaluate the performance of personnel at a selected communication endpoint. The tracking feature is selectively enabled or disabled for any communication endpoint in the system, and the information recorded includes the frequency and length of radio transmissions occurring at the selected communication endpoints. One example of how this recorded information can be used is for purposes of certifying the level of proficiency of personnel associated with a particular communication endpoint. More specifically, a communication endpoint may typically include a school location, and it may be desirable to certify whether the personnel at the school location are proficient in the use of the communication system, as well as to determine whether their particular safety protocol at the school location complies with local safety guidelines or regulations. By evaluating the frequency and length of individual radio transmissions occurring at the communication endpoint, an administrator or evaluator can make some conclusions regarding the overall competency level of the personnel, as well as the safety protocol of the location. According to one embodiment of the invention, an administrator of a central communications server, such as a server located at the local or district security center, has the capability to select desired communication endpoints for recording of the radio transmissions. The data is recorded and analyzed to determine the proficiency and/or competency of the personnel and the overall performance of the particular school location being evaluated.

According to yet another embodiment of the invention, control for activating selected features of the invention may be achieved by a separate digital radio network in which selected emergency responders and school personnel may communicate over this dedicated network, but a primary purpose of this network is to enable emergency responders to send a digital RF signal as another means to control the system. During crisis events, it is well known that an IP network may quickly become overburdened which can significantly slow down messaging. Further, an event occurring that may not be connected to the crisis at hand can still create a communication problem. Accordingly, while an IP network may be a reliable communication method in most circumstances, providing a redundant two-way digital radio communication network adds capabilities to the system that ensures timely communications can be conducted under any circumstance. One particular digital radio protocol that can be used in the present invention is the Digital Mobile Radio protocol (DMR).

Considering the above features of the invention, in one aspect, it may be considered a communication system especially adapted for facilitating emergency communications between communicants having respective radio systems, said system comprising: first and second computer processors located at respective communication endpoints; a communication server for managing communications between the communication endpoints; an IP communications network for interconnecting said communications server and said computer processors, said server and each of said computer processors having respective IP addresses; at least one public safety radio associated with one of said communication endpoints; at least one local radio associated with the other of said communication endpoints; at least one pre-programmed digital radio associated with said communication endpoints and operating on a different channel than said at least one public safety radio and said at least one local radio; a radio bridge for facilitating direct radio communications between said at least one public safety radio and said local radio, said radio bridge including hardware to enable connection between the radios, said bridge further including a processor that communicates with said server to receive activation and deactivation instructions sent from an authorized user, said instructions being sent as IP packets over the communications network; a digital radio module incorporated with said hardware of said radio bridge, said module providing a capability to control said radio bridge by an RF signal received from said at least one pre-programmed digital radio; computer coded instructions associated with said server and said computer processors to selectively control and monitor the system to include (i) activation and deactivation of said radio bridge as controlled by said first computer and to prevent activation and deactivation control at said communication endpoint associated with the at least one local radio, and (ii) to produce visual displays on respective user interfaces of said first and second computers; and wherein said visual displays include an indication of whether a radio bridge has been activated or deactivated by said at least one pre-programmed digital radio.

According to another aspect of the invention, it may be considered a method of communicating radio transmissions between communicants having respective radios, said method comprising: providing a radio bridge for facilitating direct radio communications between at least one public safety radio and a local radio, said radio bridge including hardware to enable connection between the radios, said bridge further including a computer processor that communicates with a communications server to receive activation and deactivation instructions sent from an authorized user, said instructions being sent as IP packets over a communications network of which said public safety radio and local radio are incorporated in; providing a digital radio module incorporated with said hardware of said radio bridge, said module providing a capability to alternatively control said radio bridge by an RF signal received from said at least one pre-programmed digital radio that operates on a different channel than said at least one local radio; providing computer coded instructions associated with said communications server and said computer processor to selectively control and monitor communications including activation and deactivation of said radio bridge, and to prevent activation and deactivation control at a location associated with said at least one local radio or said at least one pre-programmed digital radio; and generating an indication on a user interface of said radio bridge showing activation or deactivation of said radio bridge by said at least one local radio or said at least one pre-programmed digital radio as associated with one or more communication endpoints.

Other features and advantages of the present invention will become apparent from the following detailed description, taken in conjunction with the drawings.

BRIEF DESCRIPTION OF THE DRAWINGS

FIG. 21 is another user interface screen, namely, an administrator interface or display illustrating functionality associated with the situational awareness tracking feature.

DETAILED DESCRIPTION OF THE INVENTION

Figure 1:
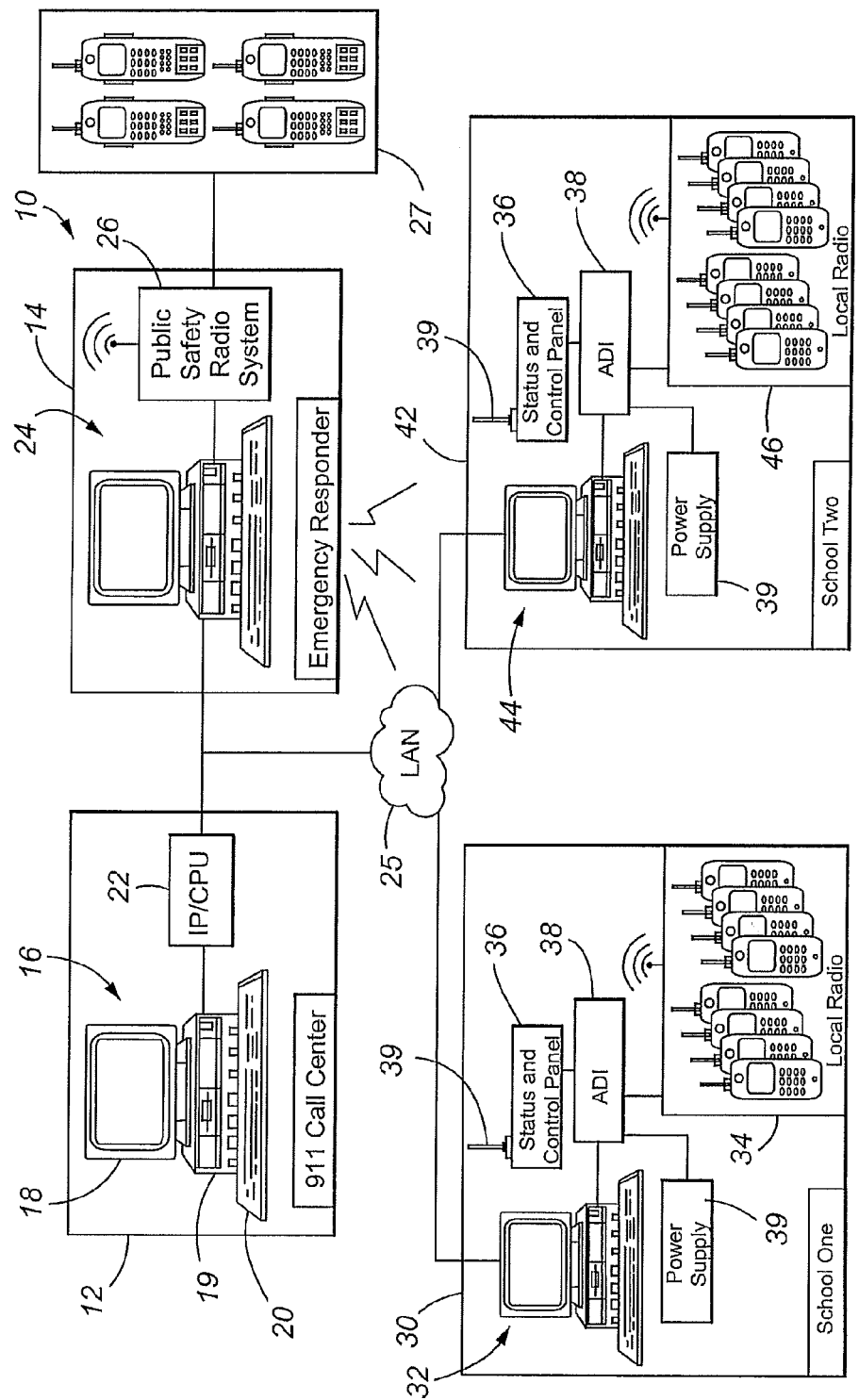
FIG. 1 illustrates a schematic diagram depicting the primary elements of the system of the present invention.

Referring first to FIG. 1, the communication system 10 of the present invention is illustrated. A 911 call center 12 is equipped with one or more computer processing units 16 which are able to administer 911 calls coming into the center and appropriately assigning actions to be taken by emergency responders located at responder location 14. A 911 call center computer/server 16 is shown as being conventional with a user interface such as a screen or monitor 18, a computer processor or server 19, and one or more input devices 20 such as a keyboard or a mouse. A separate Internet protocol/central processing unit (CPU) 22 is illustrated as being co-located within the 911-call center. This particular CPU 22 has computer-coded instructions in the form of firmware or software that facilitates the functionality of the present invention, as further discussed below. This CPU 22 may also be defined as a computer server with a connection to at least one local area network and the Internet, and can be located at any location most convenient for the users of the communication system. Although a separate CPU 22 is shown in the call center 12, it shall also be understood that the call center computer 16 could also be used to run the firmware/software of the system of the present invention; therefore, CPU 22 could be eliminated in favor of a single computing device/server. For the emergency responder location 14, it is also illustrated as having a conventional computer 24 that communicates with the 911-call center over a designated communication network, shown in FIG. 1 as a local area network (LAN) 25. The emergency responder location 14 is integrated within a public safety radio system 26. The public radio system 26 is also depicted as including a plurality of separate public radios 27, such as those that are in the vehicles or carried by police, fire, and emergency medical responders. FIG. 1 also illustrates two organizations which, when activated, may directly communicate with the public safety radios 27 of the emergency responders. Specifically, FIG. 1 illustrates two school locations 30 and 42. School 30 includes its own computer 32 that is linked by the local area network 25 to the 911-call center and the emergency responder location 14. School 30 also has its own local radio system 34 comprising a plurality of low powered radios. Like school 30, school 42 has its own computer 44 that is linked through the local area network 25 to the 911-call center 12 and the emergency responder location 14. School 42 also has its own local radio system 46 including a plurality of low powered radios. The radios used at locations 30 and 42 may be alike or different in terms of range, frequency, and other specifications. Schools 30 and 42 each have installed at their location an advanced digital interpreter (ADI) or bridge device 38 that achieves the bridge or patch enabling direct radio communications between the school radios and the public safety radio system. One example of an acceptable bridge or patch device that can be used in the present invention includes a C250 mobile multi-switcher interoperability controller sold by New Communications Solutions LLC of Norcross, Ga. The ADI 38 may have a dedicated power supply 39, such as a battery, that enables the ADI to continue to operate despite loss of power at the organization. The ADI may also be powered on the same grid power that powers the organization. In terms of the bridging capability, the ADI itself has a radio that is higher powered than the local radios it controls. System software controls the functioning of the ADI, for example, to enable activation, deactivation, or notification functions. Accordingly, the ADI may also be conceptually viewed as a "back to back" radio bridge that is remotely controlled. The ADI is also responsible for enabling the Channel Take Over and Audio Detect features. An operator with an authorized Channel Take Over feature installed at their workstation is able to essentially remotely break a circuit connection in the ADI to terminate communications between selected communication endpoints to prevent transmissions at those locations, and then the Channel Take Over feature enables the user to take control of the direction of communications by allowing only a connection to the communication endpoints in which those endpoints can receive but not transmit. Thus, the Channel Take Over can temporarily disrupt and then change directions of communications. A status and control panel 36 may be provided to enable the organization to have limited control over the communication bridge with the public radio system, as well as serving as a base radio for communicating with the other local radios. FIG. 1 also illustrates that the communication endpoints 30 and 42 also include respective antenna units 41 that are installed at the locations. These antennas in most circumstances would be required to ensure proper reception and transmission when the ADIs 38 are activated. The emergency responder location and each of the communication endpoints also have the appropriate firmware or software incorporated into their respective computer systems that enable the various functions of the system.

Figure 2:
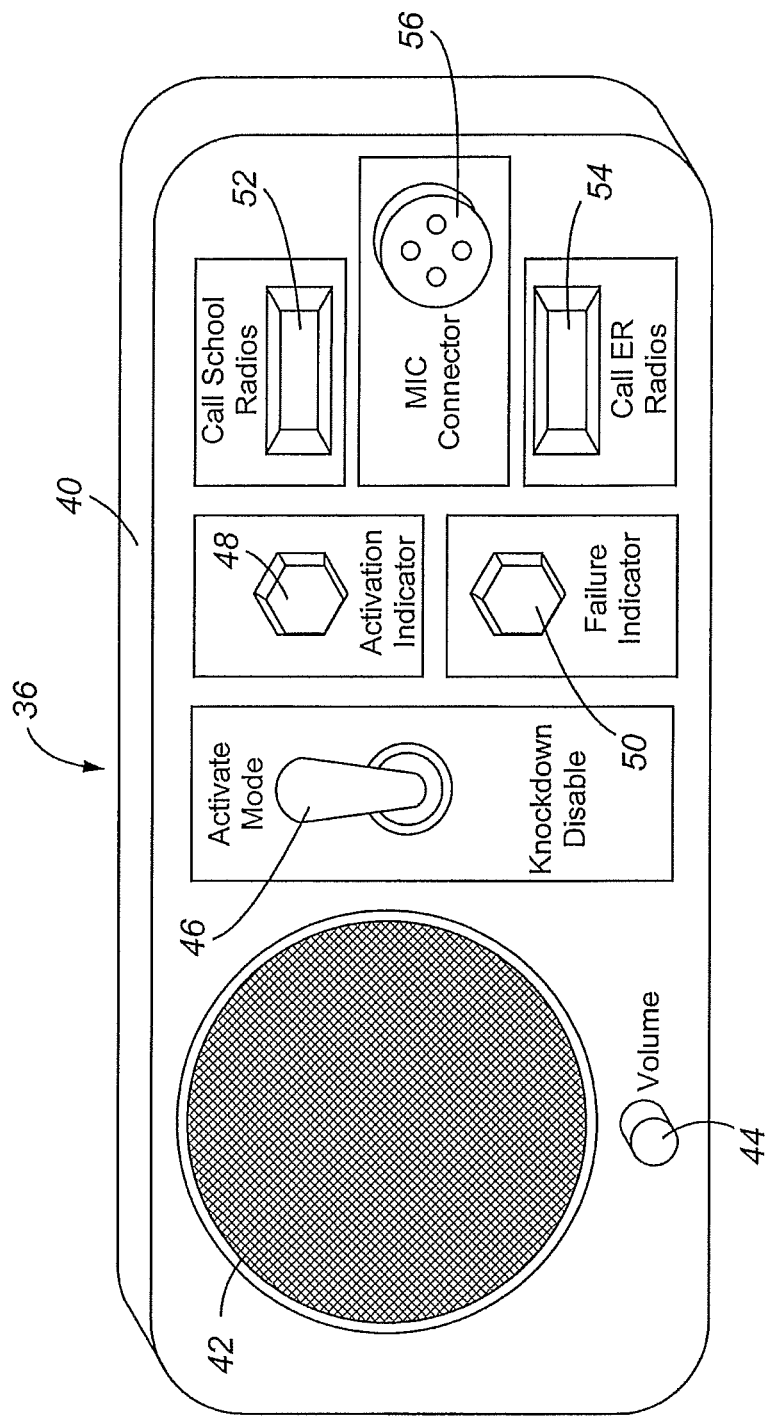
FIG. 2 is a schematic diagram of a sample local control panel installed at a communication endpoint that can be used to facilitate communications in the system of the present invention.

FIG. 2 illustrates features of the status and control panel 36 that may be incorporated at the communication endpoints. This status and control panel is a local radio 34/46 coupled with features to control or monitor the status of the ADI 38. As shown, the control panel has a housing 40 that contains the local radio. A monitor/speaker 42 is provided with a volume control 44. Push to talk buttons 52 and 54 may be provided to enable the user to call either the local school radios by pressing button 52, or contacting the emergency responders by pressing the button 54. Various indicators may be provided to show the systems status. Activation indicator 48 indicates whether the emergency communication system has been activated. Failure indicator 50 indicates for example whether there has been some type of failure, such as loss of power, failure of the bridge connection provided by ADI 38, and/or knockdown of the bridge by the 911-call center. A switch 46 may also be provided to enable the user to maintain the system in an activated mode, or to disable the communication bridge, as may be instructed by emergency responders or the 911 call center.

During an emergency, one of the locations 30 and 42 contacts the 911-call center, either by telephone, or through the local area network. In the event contact of the 911-call center was conducted through the local area network, it is also contemplated that the communication endpoints have VOIP telecommunications capability. Once the call center receives the notice of the emergency, the 911-call center selectively activates operation of the ADIs 38 located at one or both of the communication endpoints. The IP/CPU 22 is responsible for processing the activation request to each of the ADIs 38. Once the ADI(s) are activated, the activated end point(s) would then have the capability to conduct direct radio communications between users of the local radios 34/46 and the emergency responders carrying the public safety radios 27.

Figure 3:
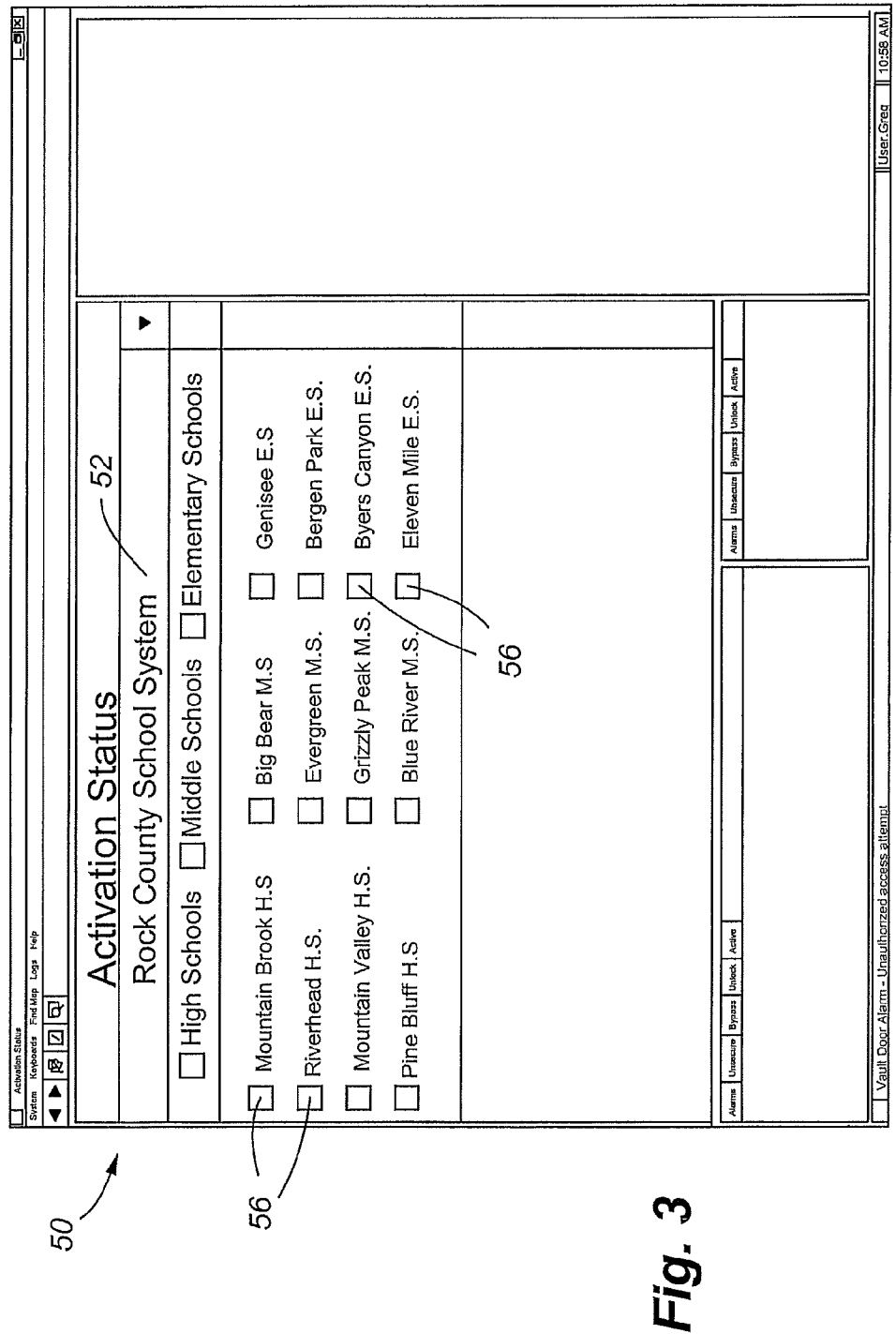
FIG. 3 is an example user interface screen associated with a computer processor having firmware or software that incorporates the functionality of the present invention.

With reference now to FIG. 3, a sample user interface screen 50 is shown. The local area network(s) may be divided into various functional units, such as school systems, shopping malls, and others. In the user screen 50, the functional group shown is a school system 52. Once the user selects the desired functional group, additional information is displayed on that selected group to include each of the separate communication endpoints 56 within the functional group. In the example of FIG. 3, the endpoints 56 are shown as the collective group of schools within the selected school system, namely, high schools, middle schools, and elementary schools. The communication endpoints 56 correspond to the example schools 30 and 42 illustrated in FIG. 1. As discussed further below with reference to FIG. 4, an activation status is provided for each of the communication endpoints. In FIG. 3, a communication bridge has not been activated for any particular school.

Figure 4:
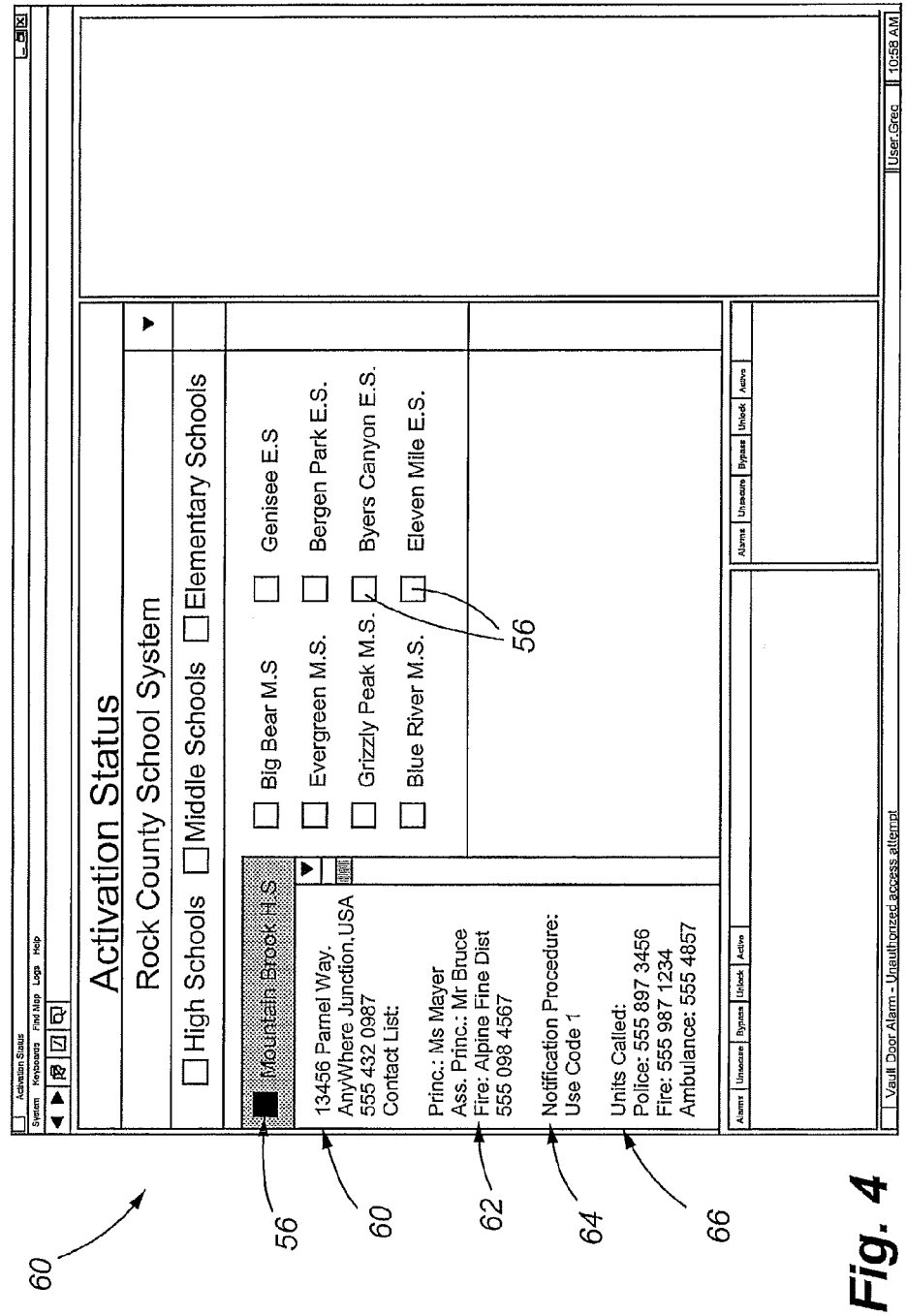
FIG. 4 is another user interface screen illustrating functionality with respect to activation of the radio bridge.

Referring now to FIG. 4, another user screen 60 is provided that illustrates information that may be displayed when any one of the communication bridges has been activated at a corresponding communication end point 56. In the example, the communication end point 56 referred to as Mountain Brook High School is shown in an activated state. During activation, information is available for viewing by the user to include the location 60 of the school, a contact list 62 of key personnel, and appropriate phone numbers associated with the location or key personnel. Other information may also appear on the user screen, such as a notification procedure 64, which could indicate a request by the 911-call center for the school to conduct a particular procedure. For example, one procedure could be the method by which key personnel at the communication end point notify others of the emergency. Another procedure could be the instructions for how emergency responders will contact designated school emergency personnel during the emergency. For this procedure, the instructions may relate to specifically how school emergency personnel are allowed to operate their local radios that communicate directly with the public safety radios of the emergency responders. The user screen 60 may also display which particular emergency responders have been dispatched to the location, shown as units dispatched 66.

Figure 5:
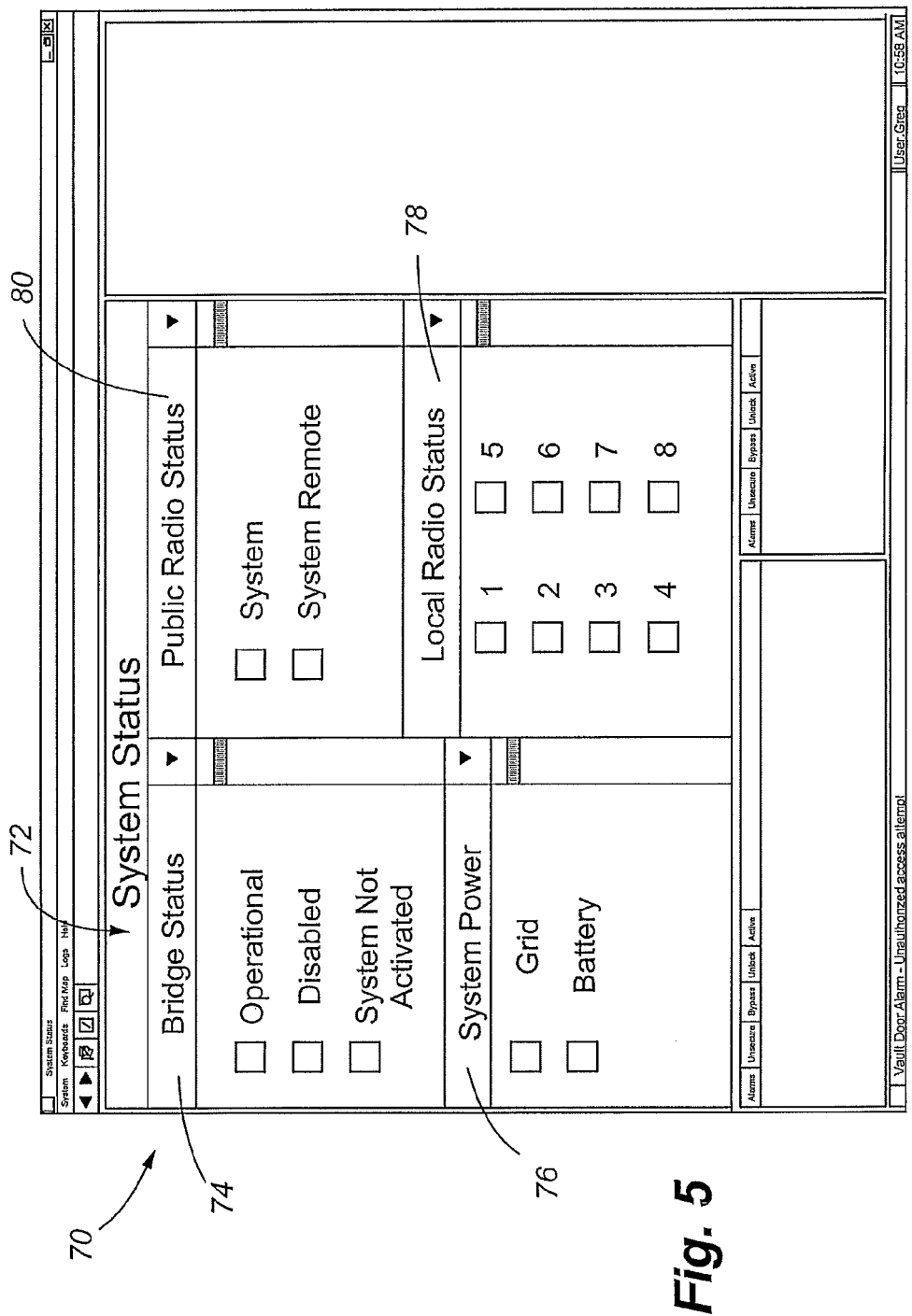
FIG. 5 is another sample user interface screen, but illustrating functionality with respect to a system status.

FIG. 5 illustrates another sample user screen 70 that may be displayed to show a system status 72. This screen may be used to supplement or replace the indicators shown on control panel 36. In this screen, separate fields may be provided to show the operational status of various elements within the communication system. For example, the status of the communication bridge between the local radios 34/46 and the public safety radios 27 may be illustrated by bridge status 74 indicating whether the overall system is operational, and/or whether the bridge has been activated or disabled. This screen also illustrates the status of system power 76, such as whether the communication end point is being run on battery power or grid power. Screen 70 further provides indicator 78 that shows the operational status of the local radios 34/46, and indicator 80 that shows the status of the public radio system used by the emergency responders. Indicator 80 may provide information on the operational status of the overall public radio system, or various remote system components, such as the individual public safety radios 27. On this particular screen, the status of the various fields may be provided by highlighting the status boxes next to the fields, as well as pull-down menus associated with each field that explains the status indicated.

With respect to the method of the present invention, it is contemplated that activation of the ADIs 38 would be controlled primarily by the 911-call center 12 or the emergency responders through their central location 14. In exceptional circumstances, the control panel 36 might be used to activate or disable the communications bridge by appropriate toggling of the switch 46. With respect to specific capabilities provided by the ADI 38, it is also contemplated that the ADI 38 could control the communication bridge or patch between one or all of the local radios 34/46, such that only selected radios at the communication endpoints could directly communicate with the public safety radios of the emergency responders. Some confusion may be avoided by limiting the number of radio communicants.

Figure 6:
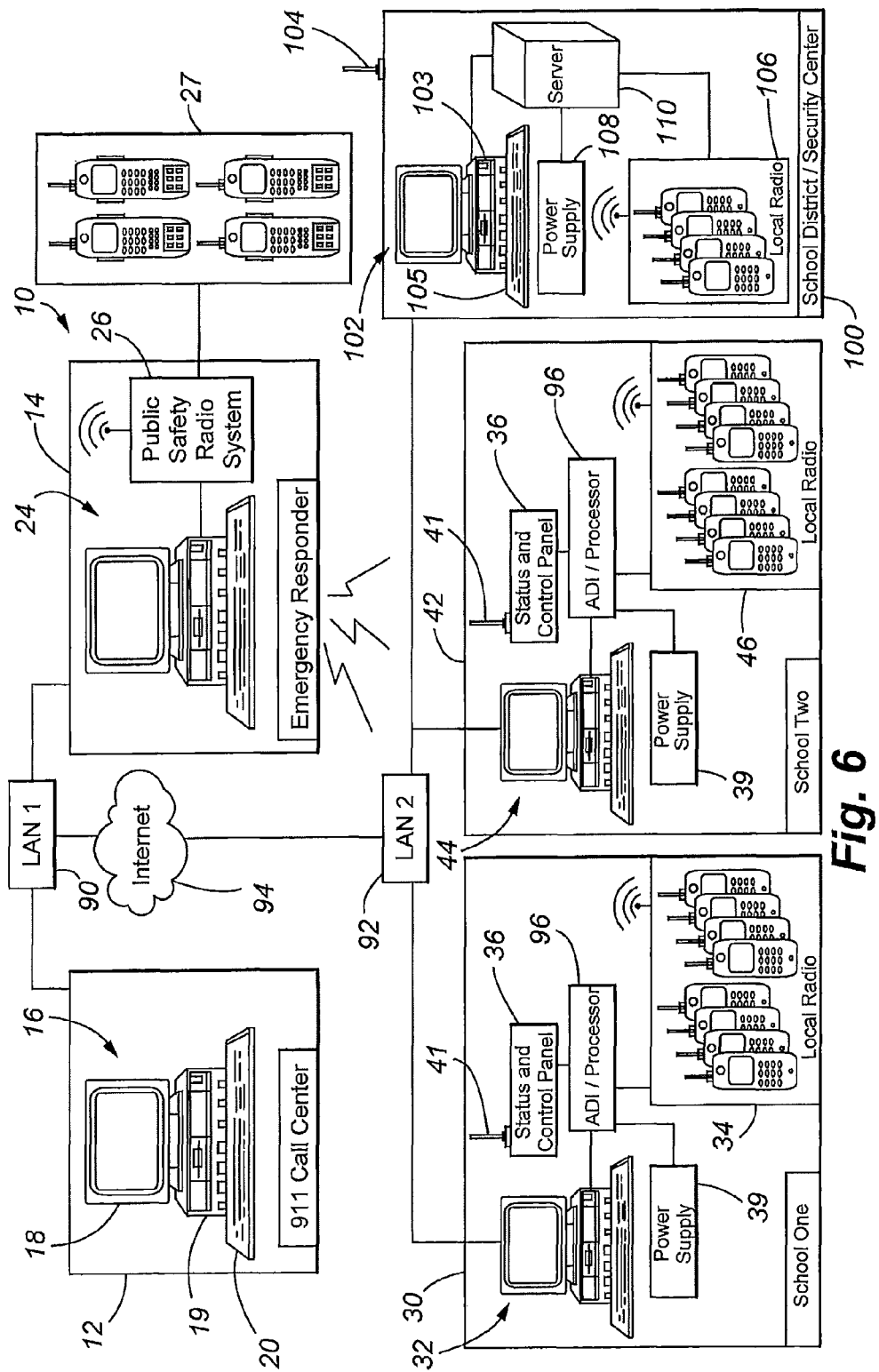
FIG. 6 is another schematic diagram depicting the primary elements of the system of the present invention in another embodiment.

Now referring to FIG. 6, in another embodiment of the invention an additional communication endpoint is illustrated, namely, a school district headquarters or school district security center 100. At that location, a communications server 110 is provided that has installed thereon computer coded instructions in the form of firmware or software that also facilitates the functionality of the present invention, as set forth further below in the discussion of the user interface screens. This server is used to manage communications between the school district/security center, the individual schools, as well as the 911 call center and emergency responders. The hardware associated with this server may be conventional, and configured to handle the necessary communications between the communication endpoints in accordance with the required internet protocol being used. A dedicated power supply 108 may be provided to power the server in the event there is a loss of power from the power grid. This location 100 may also have its own screen or monitor 102, computing device 103, and input device such as a keyboard or mouse 105. The school district/security center 100 is also illustrated as having its own local radios 106, as well as antenna 104 to facilitate the wireless link between the radios 106 and the public safety radio system. FIG. 6 also illustrates schematically another example of how the communications may take place between the different endpoints. In FIG. 6, it is shown that the emergency responder 14 and 911 call center 12 may have their own local area network 90, while school 1 and school 2, and the school district/security center have their own by local area network 92. When the bridge is established between the public safety radio system and the schools/school district, a high speed transport system such as the Internet/World Wide Web 94 is the interconnecting communication network. As understood by those skilled in the art, the server 110 may be coupled with routers or switches, which direct the designated communications to the correct communication endpoints. It shall also be understood that the server can perform other traditional server functions, such as maintaining user privileges, storing archival history, and updating configurations among the communication endpoints. The server 110 also has the ability to enable e-mail or text messages to any other networks in which the bridge has been established, as discussed further below with respect to the establishment of notification groups by e-mail. The server 110 can also be programmed to provide other services such as voice-over Internet protocol (VoIP). The software/firmware of the invention is installed at each of the communication endpoints and may be specially configured based upon the type of organization that is located at that communication endpoint. For example, a particular school may only have the capability to view notification screens, while other communication endpoints like the school district may have the capability to activate the communication bridge as well as view any notifications. It shall be understood that the specific software associated with the present invention may therefore by configured to display only the desired information at the designated communication endpoint. Connections to the local area network and status and activation commands are configured and monitored by the network server 110. So long as the communication endpoints maintain a valid connection to their corresponding local area networks, properly configured software at the communication endpoints can perform the functions of the invention, such as activating the communication bridge or monitoring system messaging. The communication endpoints ability to interact with terminal operators/users and other software applications is an additional functionality that enhances the primary purpose of providing the direct voice communications between the various radio user groups.

FIG. 6 also illustrates that each of the ADIs 96 may be configured as stand-alone units where each unit has its own computer processor to include data storage, software and IP communications capability combined with the ADI functionality. Accordingly, the ADIs in this embodiment are labeled as ADI/Processors and each has its own IP address corresponding to the particular communication endpoint in which it is installed. An IP packet sent in a command from an activating party over the communication network(s) will be received by the selected IP address(es) corresponding to the designated ADI/processor(s), and the processor(s) will then trigger their coupled ADI(s) to make bridges with the designated communication endpoint(s), or to knock-down the bridges if the activating party wishes to deactivate the bridges. In one preferred configuration of the present invention, there is a dedicated ADI for each local radio to be bridged, but only one processor is required to interface with the multiple ADIs. Accordingly, it shall be understood that the symbol ADI/Processor 96 in FIG. 6 can also mean multiple ADIs if multiple local radios are to be bridge at the communication endpoint.

Figure 7:
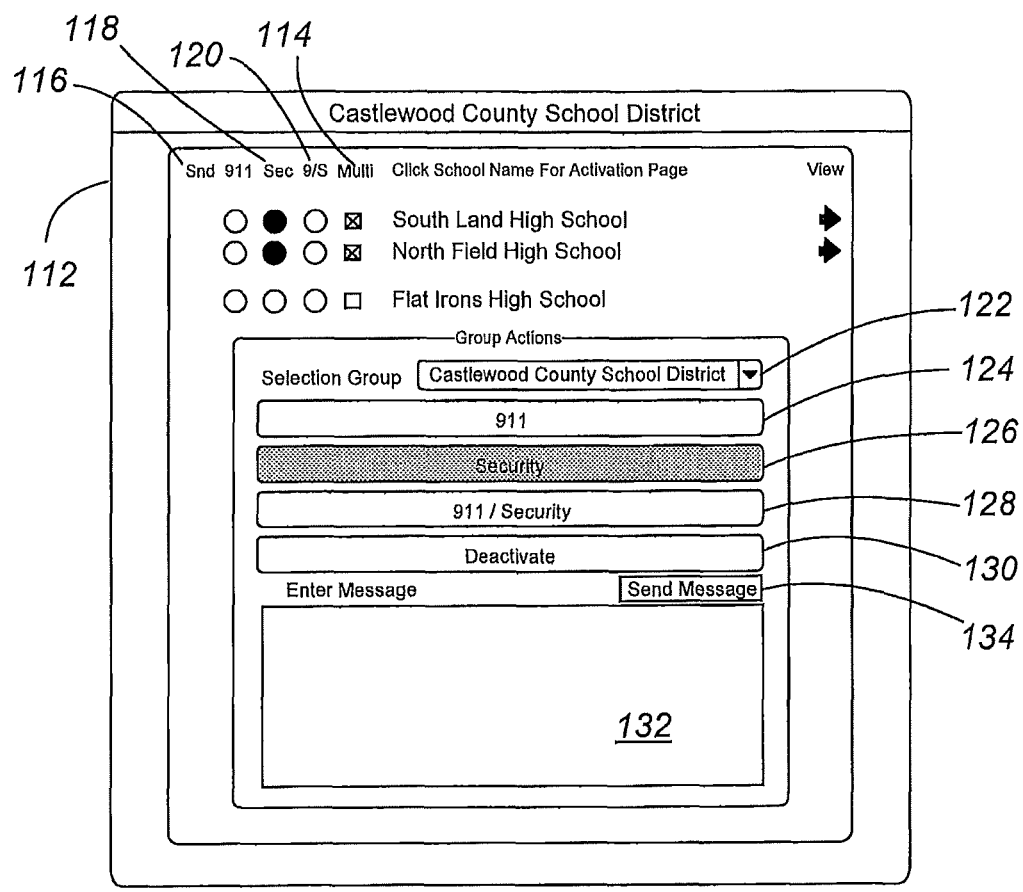
FIG. 7 is another example user interface screen associated with the present invention, namely, a school district activation screen.

Referring now to FIG. 7, a school district activation screen 112 is illustrated, and can be viewed at an operator terminal located at the school district/security center location 100. Authorized users can use this screen to activate, deactivate the bridge and send messages to intended recipients. There are two types of activations that may occur, namely, a bridge activation between emergency responders and the schools/school district (a 911 activation), and activation of the bridge between the schools and the school district/security center (a security activation). In order to activate a bridge, the user would select the school or schools by clicking on the square icon in the "multi" column 114. Once the schools were selected, the user would then select the desired activation bar, namely, a 911 activation 124, a security activation 126, or both a 911 and security activation 128. In the example of FIG. 7, the user has selected to bridge the radios between the school district/security center 100 and the selected school locations as indicated by the highlighted security bar 126. Accordingly, the security icons 118 are displayed in different colors or shading, indicating their activated status. In this screen, two of the three schools show an activated bridge status, namely, South Land High School and North Field High School. Icons 116 are provided for displaying 911 activations, and another set of icons 120 display combined activations including 911 activations and security activations. Also in the example of FIG. 7, the particular selection group is the Castlewood School District. The pull down menu 122 allows the user to select the particular group for activation/deactivation. Each group may comprise different groupings of communication endpoints. Bar 130 allows the user to deactivate all or selected ones of the activated communication endpoints. This deactivation is achieved by selecting the corresponding square icon 114 for the particular school, and then selecting the deactivate bar 130 to deactivate the bridge between those selected communication endpoint(s). FIG. 7 also illustrates a message window 132 in which the user may enter free form text for the sending of e-mail messages to the schools within the selection group. Accordingly, the user would type in the message within the message window and select the send message button 134 in order to e-mail the messages to the members of the selection group. Once a communication endpoint has been deactivated, the icon returns to its normal or uncolored status.

Figure 8:
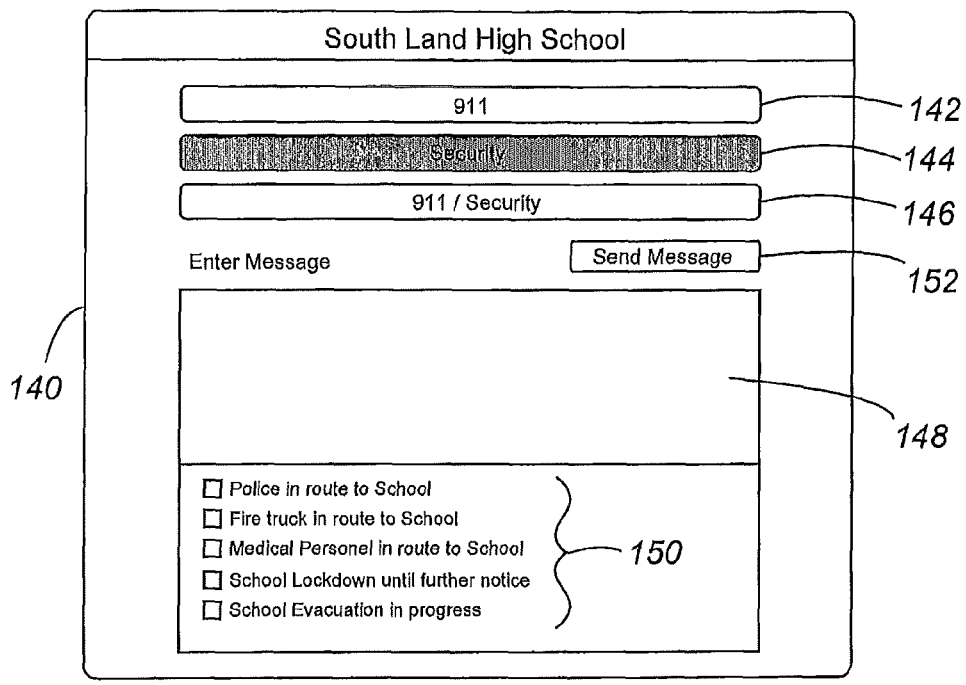
FIG. 8 is another user interface screen, namely, a school activation screen.

Now referring to FIG. 8, a school activation screen 140 is illustrated. This screen can be used if it is only necessary to activate or deactivate the communication bridge between a particular selected school and the emergency responders or school district/school district security center. The activation bars 142, 144, and 146 work in the same manner as the activation bars set forth above in FIG. 7 for bars 124, 126, and 128. In this example, the user has activated the communication bridge between Southland High School and the district security center by selecting bar 144. Screen 140 also includes a message window 148 for entry of free form text, as well as provision of a standard message group 150 in which the user can select the appropriate preconfigured message to send. As shown, the standard messages 150 include some that might be typical in an emergency situation at the selected school.

Figure 9:
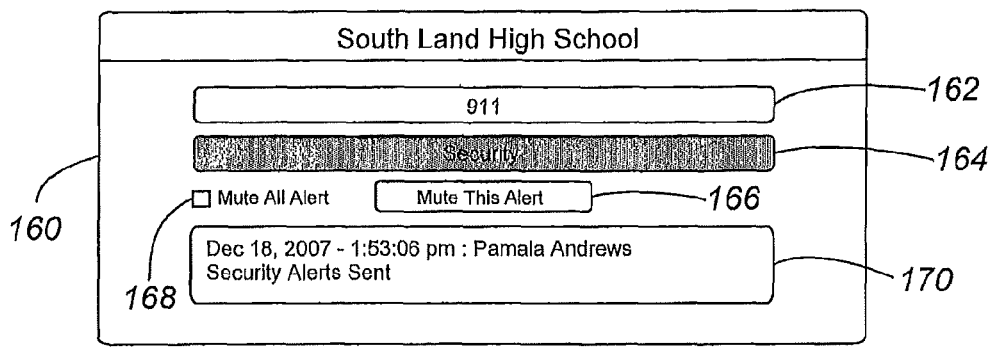
FIG. 9 is another example user interface screen, namely, a school notification screen.

FIG. 9 illustrates a notification screen 160 that can be viewed on user terminals without activation privileges. This screen displays the status of the selected school/location when an activation has been performed by other users within the system. An "alerting icon" can provide sound and a visual alert on the user's computer terminal that has notification software and privileges. Once the alerting icon alerts, the user can select a desktop icon to display this notification screen. On the notification screen, various items are shown to include which type of activation has occurred at that location. In the example, the two notification types can be viewed, namely the 911 activation 162 and the security activation 164. In this example, the security activation 164 has been made as indicated by the highlighted icon, thus the school district/district security center radio users can communicate directly with the school radio users. This notification screen also shows other features to include capability for the user to mute the audible/visual alert by selecting button 166, or by muting all of the alerts associated with the notification by selecting box 168, and then selecting button 166. Message window 170 provides details on the activation, to include the date, time, person responsible for activation, and any other notification information generated by the activating party.

Figures 10, 11:
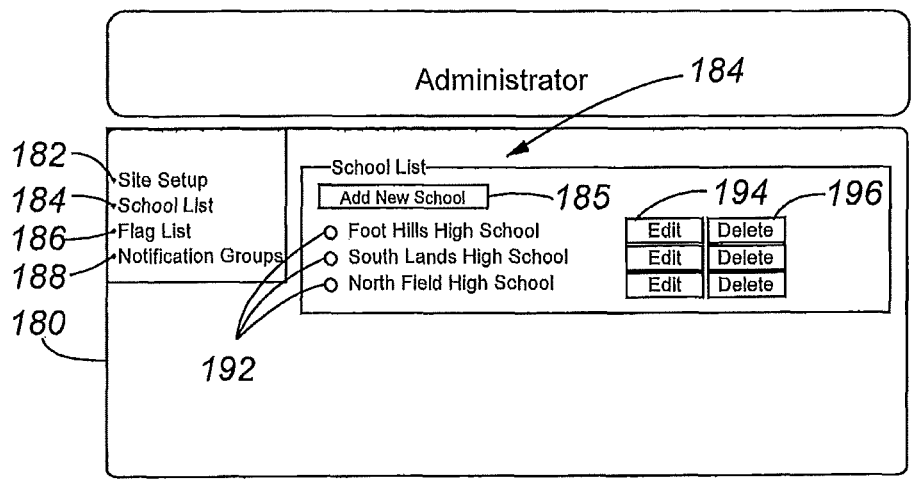
FIG. 10 is another user interface screen, namely, an administrator screen allowing the setup of various communication endpoints within the system, such as schools in a particular school district.
FIG. 11 is another user interface screen, namely, an administrator screen that is used to establish records for a particular school within the communications system.

FIG. 10 illustrates an administrator screen 180 that may be used by a system administrator in order to set up user locations on the communication system, establish types of user access, licenses, and other functions as explained below. Specifically, FIG. 10 shows a selection list of options for the administrator in setting up the system to include a site setup option 182, a school list option 184, a flag list option 186, and a notification group option 188. In FIG. 10, the school list option 184 is selected where the administrator may add new schools as communication endpoints, may edit communication capabilities or information on existing schools, or may delete schools. In the figure, three schools are shown 192 as being existing members of the school list. Selecting edit button 194 or delete button 196 for the listed school enables the administrator to edit information or access privileges for the school, or to delete the school from the listing.

Referring to FIG. 11, another administrator screen 180 is provided which enables the administrator to edit site information for each school/location that is a communication endpoint within the system. As shown, the site information block 198 enables the administrator to enter appropriate school/location information. Block 200 is provided for the administrator to view existing site software licenses, or to upload and submit new site software licenses to the server in order to grant additional users to the particular location and/or to change access privileges for the school/location.

Figure 12:
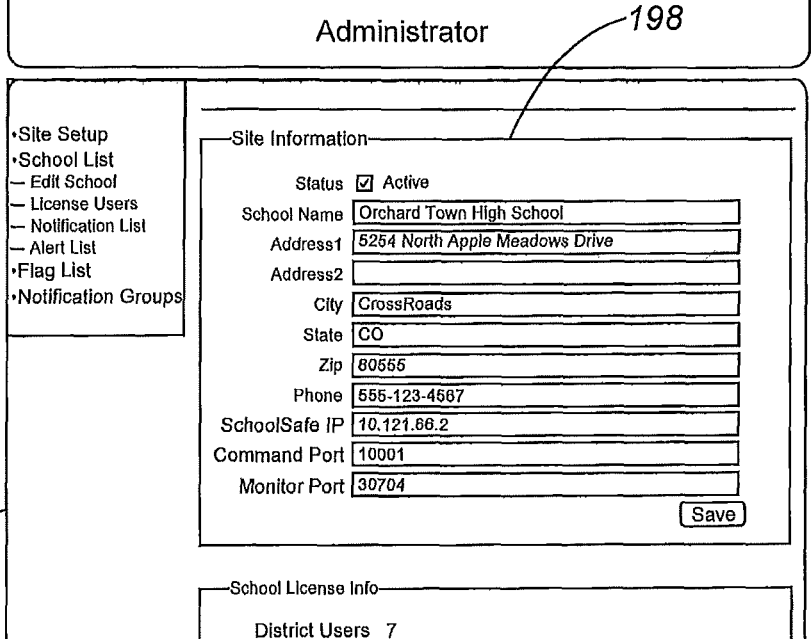
FIG. 12 is yet another user interface screen, namely, an administrator screen allowing necessary information for establishing a school as a communication endpoint within the system to include IP address information, and software user licenses.

FIG. 12 is another administrator screen 180 that allows an administrator to enter or edit additional site information 198, to include the IP address for the particular site as a communication endpoint. The Command Port and Monitor Port refer to the data ports on the server 110 that allow the server to control and monitor the ADI/Processor 96 having the matching IP address located at that communication endpoint. FIG. 12 also shows additional license information 200 for a particular school/location. For example, this screen lists the number of district users, activation users, and notification users at that school location. As shown, the license information 200 also allows a user to upload new licenses to the server, and to assign the appropriate license and key files setting forth the requisite access privileges for new system users.

Figure 13:
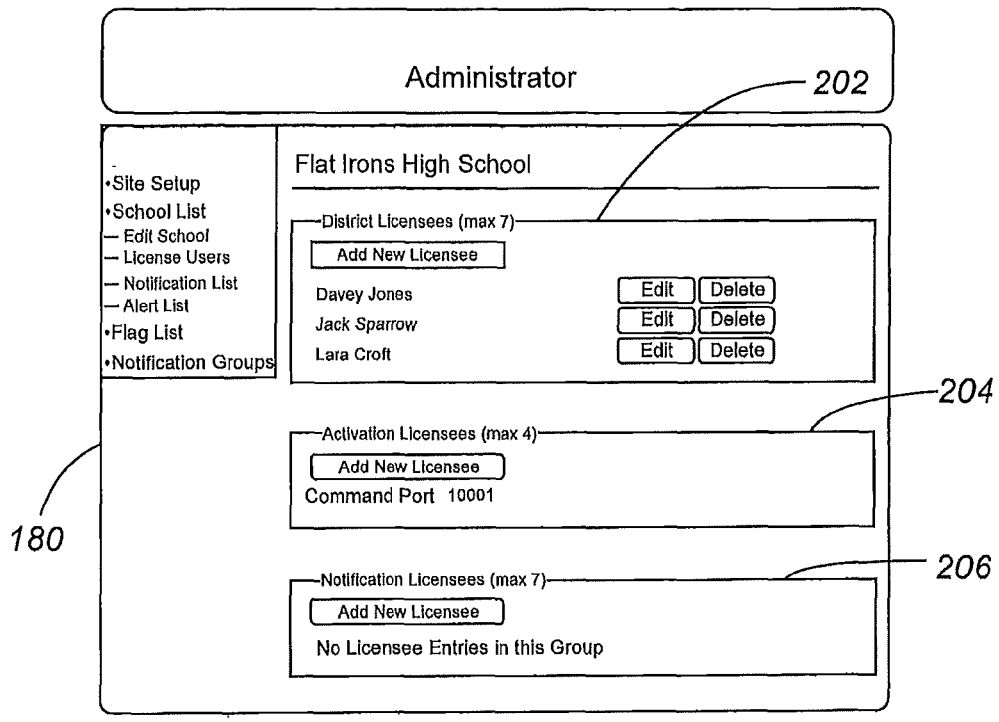
FIG. 13 is another user interface screen, namely, an administrator screen that tracks and records various software license types used within the system.

FIG. 13 is another administrator screen 180 that lists particular users 202 at a school/location. As shown, the administrator can edit or delete users, as well as to add users for that particular school/location. Block 204 on this screen also enables the administrator to add additional activation licenses for that location that correspond to a particular command port. Block 206 in FIG. 13 also allows the administrator to add new notification licenses for the location.

uninterrupted power supply for periods when primary AC power fails. Preferably, the radios, power supply, ADI/processor are housed in a module (not shown) that is installed in a secured location where power, LAN and antenna cabling can be accessed. The module itself may have status LEDS and a local control switch if the local area network should fail.

Figure 14:
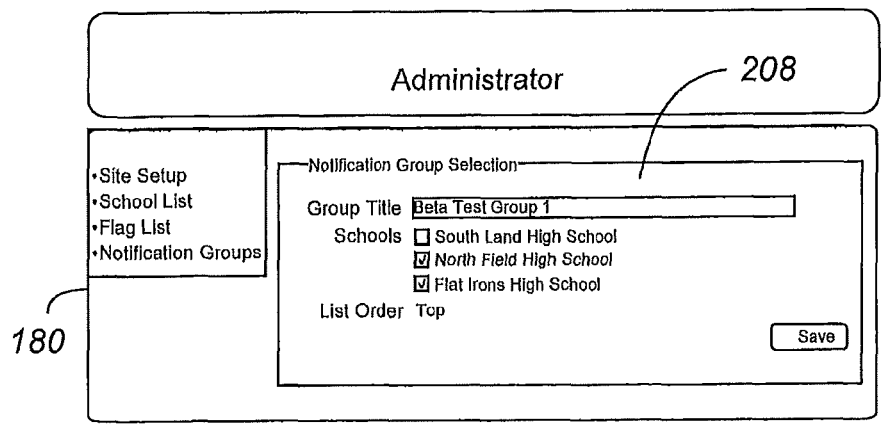
FIG. 14 is yet another user interface screen, namely, an administrator screen that is used to establish notification groups within the system.

FIG. 14 illustrates yet another administrator screen 180 used for setup of notification groups. In the example, the notification group 208 has been given the title BETA TEST GROUP 1, and includes three high schools. Two of the high schools are selected from the group, meaning that the administrator also has the ability to only select certain communication endpoints from the notification group to actually receive notifications during an activation. Thus, North Field High School and Flat Irons High School have been selected for receiving notifications, while South Land High School may be within the notification group, but has not been selected to receive notifications.

Figure 15:
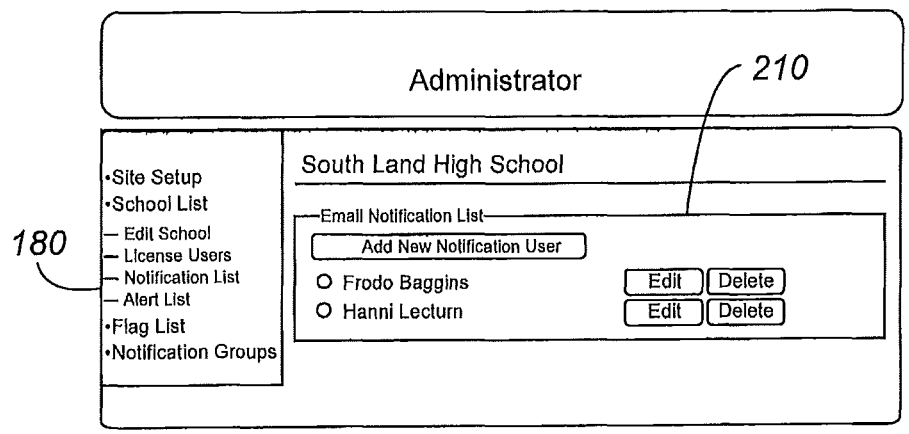
FIG. 15 is yet another user interface screen, namely, an administrator screen that is used for establishing e-mail notification lists within the system.

FIG. 15 illustrates yet another administrator screen 180 that allows an administrator to establish an e-mail notification list 210 for particular communication endpoints. In this example, the communication endpoint is South Land High School, and the personnel who receive e-mails during an activation include the two individuals listed in the screen, namely, Baggins and Lecturn. As shown on the screen, new notification users may be added to the e-mail notification list, existing members can be deleted, or member information can be edited. The various e-mail addresses of the notification list members are entered, and these members then automatically received e-mail notifications during an activation that may affect their communication endpoint. These notifications may also include the audio and/or visual alarms sent to their computer workstations.

Figure 16:
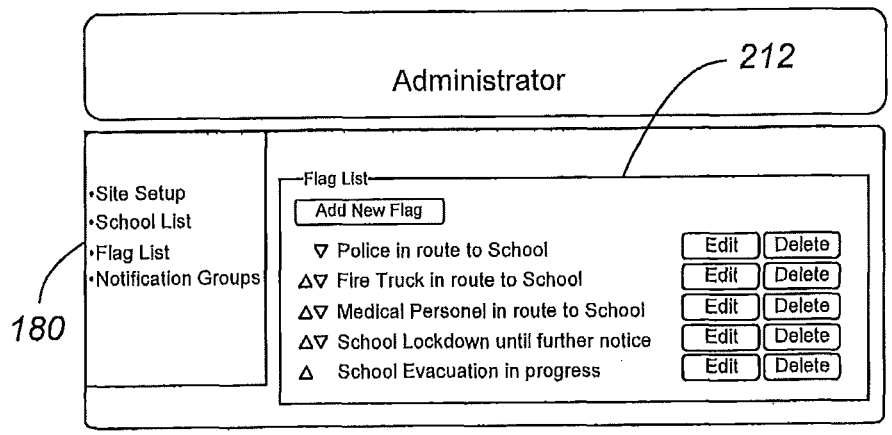
FIG. 16 is yet another user interface screen, namely, an administrator screen that is used to setup the pre-established or preconfigured message lists, referred to as a flags.

FIG. 16 is yet another administrator screen 180 that shows a particular flag list 212 that may be used as a messaging technique either by an activating party, or one of the communication endpoints. In the example, one of the standard messages is "Police in route to School", is a one-way message that can be sent from the emergency responders to the schools, as annotated by the single arrow pointing down. Another of the messages, namely, "School Evacuation in progress" is a one-way communication that is provided by the affected school back to the emergency responders, as annotated by the single arrow pointing up. There are three two-way standard messages listed, it being understood that either the activating party/emergency responders or the schools can send those messages.

Figure 17:
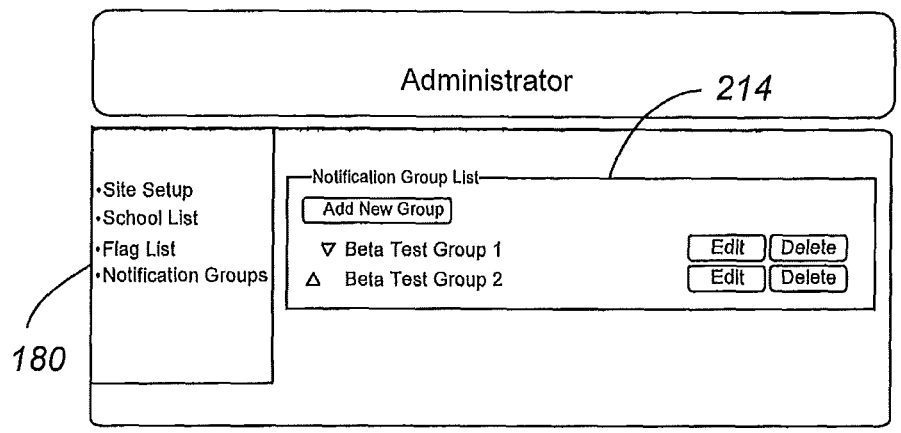
FIG. 17 is another user interface screen, namely, an administrator screen that is used to add, edit, or delete a notification group listing.

Referring to FIG. 17, another administrator screen 180 is shown that enables an administrator to add, edit or delete a particular notification group. As shown, the notification group list 214 includes two Beta test groups. If it is desired to add another notification group, then the administrator would select the "Add New Group" button. As mentioned with respect to FIG. 14, each communication endpoint within a notification group has its own IP address that can therefore be contacted by a party having activation privileges.

Figure 18:
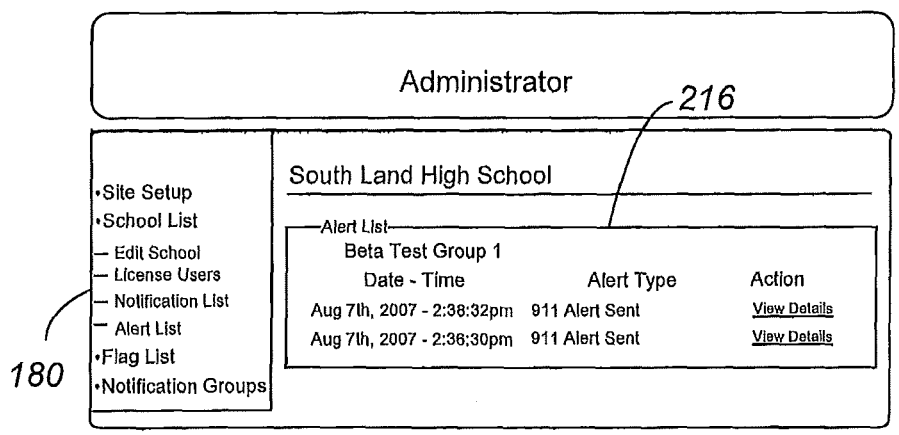
FIG. 18 is yet another user interface screen, namely, an administrator screen illustrating recorded alert messages previously sent within the system.

Referring to FIG. 18, another administrator screen 180 is provided. In this screen, an alert list 216 is shown that provides a log of any or selected activations that may have occurred over a selected period of time. In the example, the alert list shows two alerts that occurred within Beta test group 1 on Aug. 7, 2007. In the alert list, the date, time, and type of alert are shown. By selecting the "View Details" buttons, the user can view other details (not shown) that may have been recorded about the activations occurring at those two times. This alert list information can be used for official record keeping, and also for predictive actions to be taken in the future for communication endpoints that may have special needs.

Figure 19:
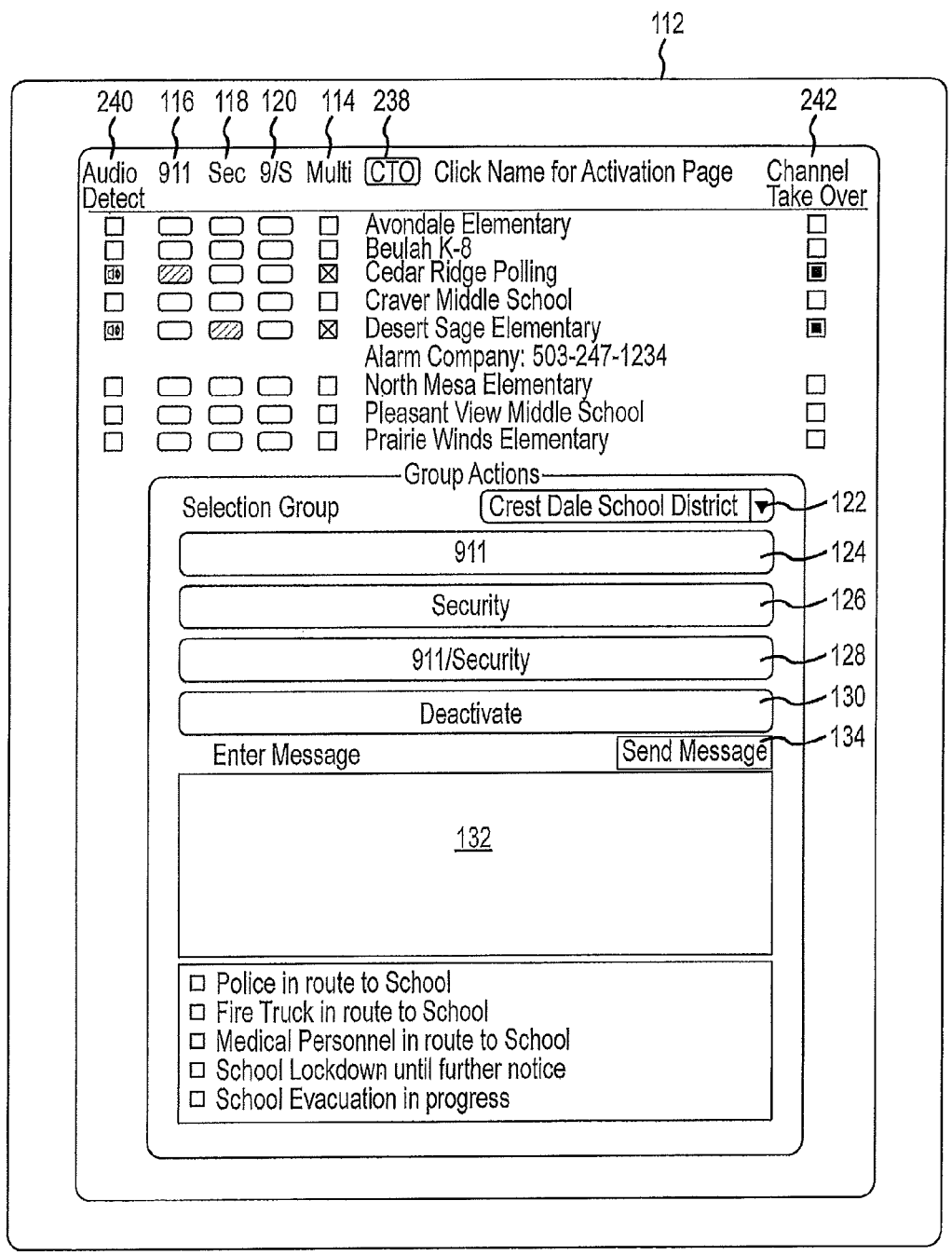
FIG. 19 is yet another user interface screen, namely, a school activation and status screen including depiction of an Audio Detect feature and a Channel Take Over feature.

Referring to FIG. 19, additional features of the invention are illustrated to include Channel Take Over and Audio Detect. FIG. 19 illustrates a user screen in which a user having proper authority is able to activate the Channel Take Over feature by clicking on the Channel Take Over (CTO) button 238. Not every remote location may have the Channel Take Over feature, it being contemplated that dispatcher and emergency responder locations would have this functionality to activate Channel Take Over. Further, it is contemplated that Channel Take Over would be a password controlled feature which required the user to previously enter a password when the user signed on to the system, or a separate user ID/password could be required to activate this feature. In the example of FIG. 19, the user has made the determination it is necessary to intervene with particular radio communications occurring at two locations by activating the Channel Take Over feature. The two affected locations are the Cedar Ridge Polling, and the Desert Sage Elementary. Once the user activates the CTO button 238 by clicking on the button with the computer cursor, the user would then move the cursor to the Channel Take Over column 242 and would click on the particular location for which the Channel Take Over is to be activated. If the user wished to silence transmissions at a particular location, the user would therefore click on the corresponding box/icon at that location in column 242 in order to temporally prevent radio transmissions from being sent from those locations to include all local radios at that location. This Channel Take Over feature is activated for different selected periods of time enabling the Channel Take Over user to initiate radio transmissions. The Channel Take Over feature times out at the end of the selected period thereby restoring two-way communications between all users. In this example, if the Cedar Ridge Polling location or the Desert Sage Elementary location were transmitting at the time the Channel Take Over feature was activated, the system would generate a dominating higher power radio signal to those locations, thereby instantly causing interference until the users at those locations stopped transmitting and started receiving. More specifically, the higher powered radios within the ADIs at those locations would transmit interfering radio signals to disrupt the transmission from the locations. The radio users transmitting at those locations would hear, for example, a high pitched continuous signal that would inherently cause them to stop transmitting. During the time period in which the Channel Take Over feature was activated, the user screen 112 would show the column 242 with the selected boxes/icons in an activated state, such as darkened, flashing or colored. Once the Channel Take Over feature expires at the end of the preselected channel takeover period, then the Channel Take Over icons in the column 242 would return to their normal inactivated state. It is also contemplated that the Channel Take Over feature could remain in place until the user manually deactivated the Channel Take Over feature, for example by again clicking on the appropriate boxes/icons in the column 242. Thus, the icons in column 242 could be programmed as on/off buttons.

With respect to the Audio Detect feature, this is illustrated in FIG. 19 as the Audio Detect column 240. This particular feature may be considered more passive as compared to the Channel Take Over feature, in that the Audio Detect feature 240 simply advises the user as to whether radio transmissions are occurring at a particular location at a particular time. In the example of FIG. 19, the Cedar Ridge Polling and Desert Sage Elementary locations are shown as transmitting, as indicated by the speaker symbols within the boxes/icons of the Audio Detect column 240. In this example, this may be the reason why the Channel Take Over user decided to activate the Channel Take Over feature to prevent those two locations from transmitting at that particular time. Once the Channel Take Over feature is activated, the icons in the Audio Detect column 240 would return to an inactivated state for those two locations since no transmissions would be generated from those locations. FIG. 19 shows both the Channel Take Over feature and Audio detect features activated on the same Figure for brevity purposes, it being understood that once the Channel Take Over feature is activated, transmissions cease at the designated locations and the Audio Detect boxes/icons would be shown in an inactivated state.

Figure 20:
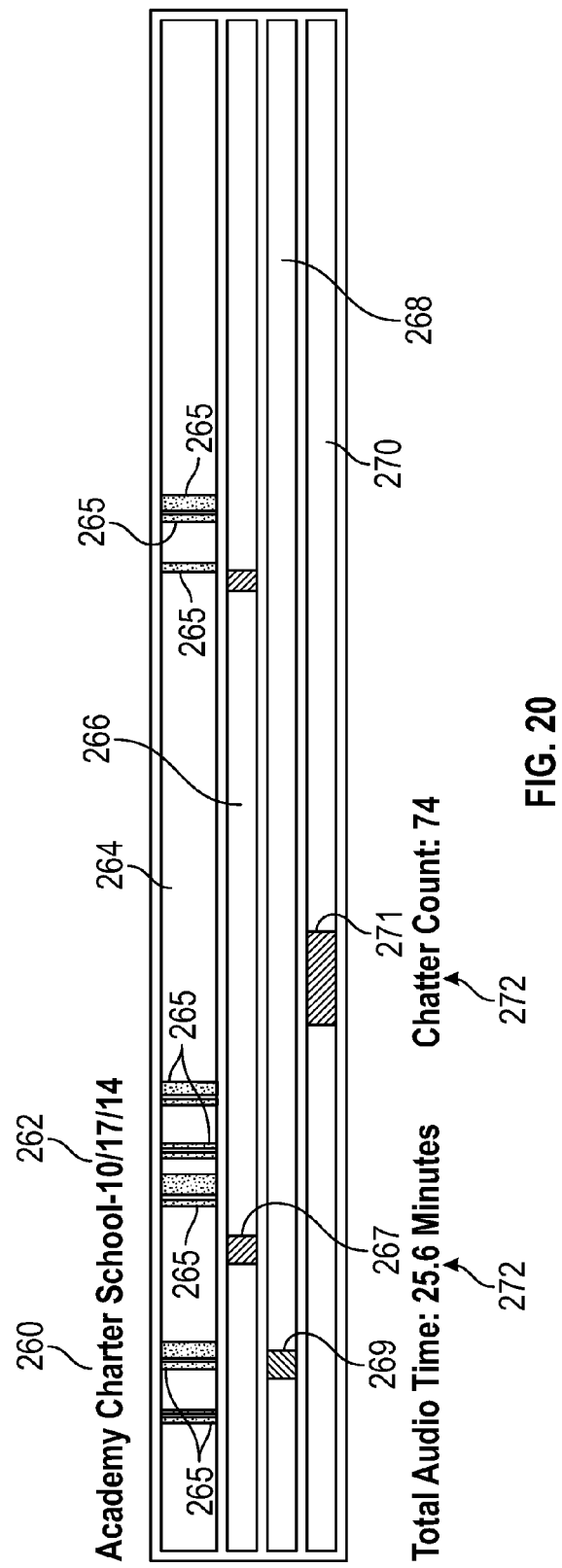
FIG. 20 is a graphical representation of data recorded with respect to a situational awareness tracking feature of the invention.

Referring to FIG. 20, the tracking feature of the invention is illustrated with respect to how tracking information may be displayed on a user interface. The tracking feature may also be referred to as a "situational awareness tracker". The data shown in the user interface can be analyzed to determine the extent to which selected personnel or an entity as a whole located at a communication endpoint demonstrates proficiency and competency with respect to use of the communication system. According to one embodiment, the communications server 110 may include the required software or firmware which allows an administrator to selectively activate the tracking function at one or more communication endpoints. For example, the communications server 110 having the Audio Detect feature may further include the capability to record system activity to include radio transmissions and other communications that may take place within the system such as 911 activation, a security activation, and Channel Take Over occurrences. The entity located at the communication endpoint is displayed at 260, and the date upon which the tracking function was activated is displayed at 262. An audio activity indicator 264 is shown in FIG. 20 in which each radio transmission from that communication endpoint is indicated by a vertical bar 265. The width of each bar 265 provides a relative indication of the length of the radio transmission. Accordingly, the length of the audio activity indicator 264 may correspond to a particular length of time as selected by a system administrator, and each of the vertical bars 265 represent the duration or length of the separate and distinct radio transmissions. Directly below the audio activity indicator 264 is a 911 activation indicator 266. The indicator 266, like the indicator 264, includes a vertical bar(s) showing discrete occurrences of 911 activations that may have occurred within the same timeframe. In the example of FIG. 20, there was a single 911 activation 267. In terms of a corresponding time sequence, the 911 activation 267 is illustrated at the corresponding time in which the activation 267 occurred as compared to the activity illustrated within the indicator 264. Directly below the indicator 266 is a security alert indicator 268. The indicator 268, like the other indicators, includes vertical bar(s) showing discrete occurrence(s) of a security activation(s) that may have occurred within the same timeframe. The example of FIG. 20 shows a single security activation 269. Again, the security activation 269 is shown at the corresponding time in which this activation 269 occurred as compared to the other data illustrated in FIG. 20. Directly below the indicator 268 is a Channel Take Over indicator 270. This indicator 270 is like the other indicators, in which a vertical bar(s) 271 show discrete occurrence(s) of Channel Take Over occurrence(s) occurring within the same timeframe. The example of FIG. 20 shows a single channel take over occurrence or event. It should be understood that FIG. 20 provides but one example of occurrences or events in combination within a single user interface display in which the occurrences/events are chronologically aligned and displayed together, and it may be advantageous to provide other combinations or sub-combinations of the data for analysis purposes. An additional feature of the tracking function is a selected text display 272 which may provide a summary as to recorded data. In the example of FIG. 20, additional data is provided, namely, the total audio time for radio transmissions during the recorded timeframe (25.6 minutes), and the "chatter" count (74), which is a numerical count of each individual and separate radio transmission that occurred at the communication endpoint during the recorded timeframe.

The data illustrated in FIG. 20 has many purposes. One purpose is to evaluate the performance of the entity located at the communication endpoint and/or the particular personal located at the communication endpoint in terms of activity occurring at the recorded timeframe. For example, the Academy Charter School on Oct. 17, 2014 may have been undergoing a training exercise in which a training scenario was conducted, and events were generated by a training coordinator to simulate an emergency situation. The number and duration of radio communications taking place during the recorded timeframe can be analyzed to determine whether personnel operating radios at the location were communicating in an effective manner. The number and duration of radio communications can be analyzed to determine whether the situation at hand warranted the type of radio communications that occurred, and whether the proper personnel were communicating at the critical times during the training event. The inclusion of the 911 activation and security activation events, as well as the channel take over events also provide additional background information as to the timing of the events taking place, and whether the radio communications were timely and effective based upon the training events as they occurred. In addition to the data illustrated in FIG. 20, a visual overlay may be provided of physical events that occurred during the same timeframe, such as a chronological listing of events occurring within the timeframe. This visual overlay could be represented by a physical event indicator (not shown) placed above or below the group of illustrated indicators, along with a short description or name for key events that occurred during the training exercise. Criteria and parameters can be developed for what may indicate are proficient vs. non-proficient radio practices as they relate to a particular series of physical events. For example, an excessive number of radio transmissions or excessively long radio transmissions by some radio users may indicate non-proficiency for some users or an entity at a selected communication endpoint. Conversely, too few radio transmissions or radio transmissions with too little exchanged information by some radio users may indicate non-proficiency for some users or an entity at a selected communication endpoint.

Referring to FIG. 21, an administrator display screen or user interface 280 is shown in which an administrator can activate or deactivate the tracking or logging feature. More specifically, the user interface 280 shows a logging option 282 and an activation/deactivation box 284. Selecting the box 284 would activate the logging function to record radio transmissions for the corresponding communication endpoint (Academy Charter School). Another administrator display/user interface (not shown) allows an administrator to select the particular date and time in which logging activity is to be recorded for one or more communication endpoints. Similarly, another or the same additional administrator display/user interface (not shown) allows an administrator to activate/deactivate logging of other system activity, such as the activation indicator 266, the security alert indicator 268, and Channel Take Over indicator 270.

Other features shown in FIG. 21 include the particular mode in which the communication endpoint is presently configured for operation. For example, the Academy Charter School is selected as currently operating in Mode 1 in which 2 channels are available for communication. If both channels are to be operated independently from one another, the box labeled "Mutually Exclusive" can be checked to therefore configure the channels as separately operable. The system administrator has the authority to configure each communication endpoint according to current needs for each location. Another feature shown in FIG. 21 is whether the Audio Detect feature is configured to be overridden, that is, not to be activated or operational for a particular communication endpoint. If this feature is to be overridden, the administrator can check the box accordingly to override as shown. FIG. 21 also provides the administrator the option to show when the Audio Detect feature is operational, such as when the communication endpoint is bridged, or at all times (always).

The tracking feature or "situational awareness tracker" can be programmed within the software/firmware of the server 110 such that each and every communication endpoint can be selectively tracked or recorded at any time, and at selected time intervals. A reporting function of the software/firmware allows report generation in which data can be visualized, such as the data shown in FIG. 20, in order to evaluate the performance of any entity/location within the communication system. In this regard, the server 110 acts as a master site controller that is capable of managing all communication activities, to include data recordation and report generation.

The visual information provided by the Audio Detect feature can instantly provide dispatchers and emergency responders with information relevant to whether bridging or disconnection of the bridges at specific locations should take place. For example, assuming an emergency occurred at a location such as the North Mesa Elementary. If the Audio Detect feature illustrated numerous other locations within the district showing continual radio transmissions interfering with communications to the North Mesa Elementary, the dispatcher or emergency responder at that time could make the decision to prevent transmissions from all other locations within the district except from the North Mesa Elementary. The visual display simplifies a dispatcher or emergency responder's ability to comprehend the status of the network and to then make decisions to ensure that critical communications are enabled at the location of the emergency.

Figure 22:
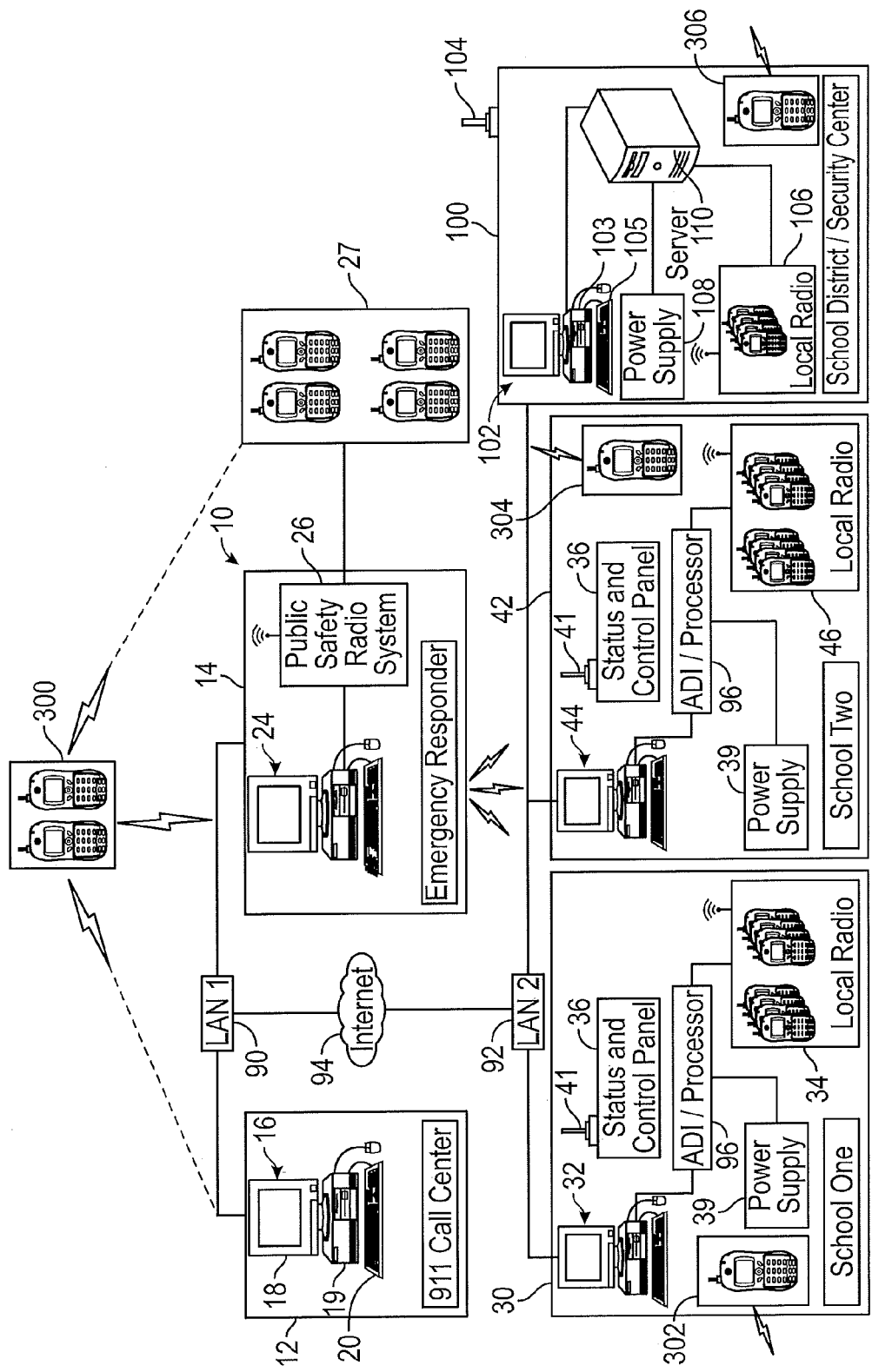
FIG. 22 illustrates a schematic diagram depicting the primary elements of yet another system of the present invention.

Referring to FIG. 22, this illustrates a schematic diagram depicting the primary elements of yet another system of the present invention. The same reference numerals used in this figure correspond to the same elements discussed for the prior embodiments. This embodiment adds a redundant radio frequency (RF) network that enables the radio bridge to be controlled by authorized pre-programmed digital radios. This radio network may include digital pre-programmed radios used within a DMR communication protocol. During a crisis event, an existing IP network may quickly become overwhelmed due to a dramatic increase in messaging traffic. In this instance, it may be more difficult to control the radio bridge strictly by communications over an IP network. Therefore according to this embodiment, a separate and independent digital radio network is incorporated such that authorized users of a digital radio may send a preconfigured digital telemetry message that is received and authenticated at the targeted communication endpoints to thereby remotely activate or deactivate a bridge. The separate and independent digital radio network operates on a different channel as compared to the other radios of the system illustrated, namely, the public safety radios and the user radios at the communication endpoints. Schematically, the pre-programmed or preconfigured digital radios 300 are shown as selectively communicating with each of the other communication endpoints in the system to include communication with corresponding digital radios at the communication endpoints, 302, 304, and 306.

In one scenario or situation, an emergency responder may be advised that there is an emergency requiring an action to activate or deactivate a bridge at a specific communication endpoint. The emergency responder then operates the pre-programmed digital radio to send a digital message that is preconfigured to be received and authenticated at the selected communication endpoint to affect the status of the radio bridge. Therefore, this remote activation through an independent RF signal can be viewed as an additional capability or a redundant capability to ensure that there is no delay in controlling a radio bridge despite what may be happening over an IP network.

Figure 23:
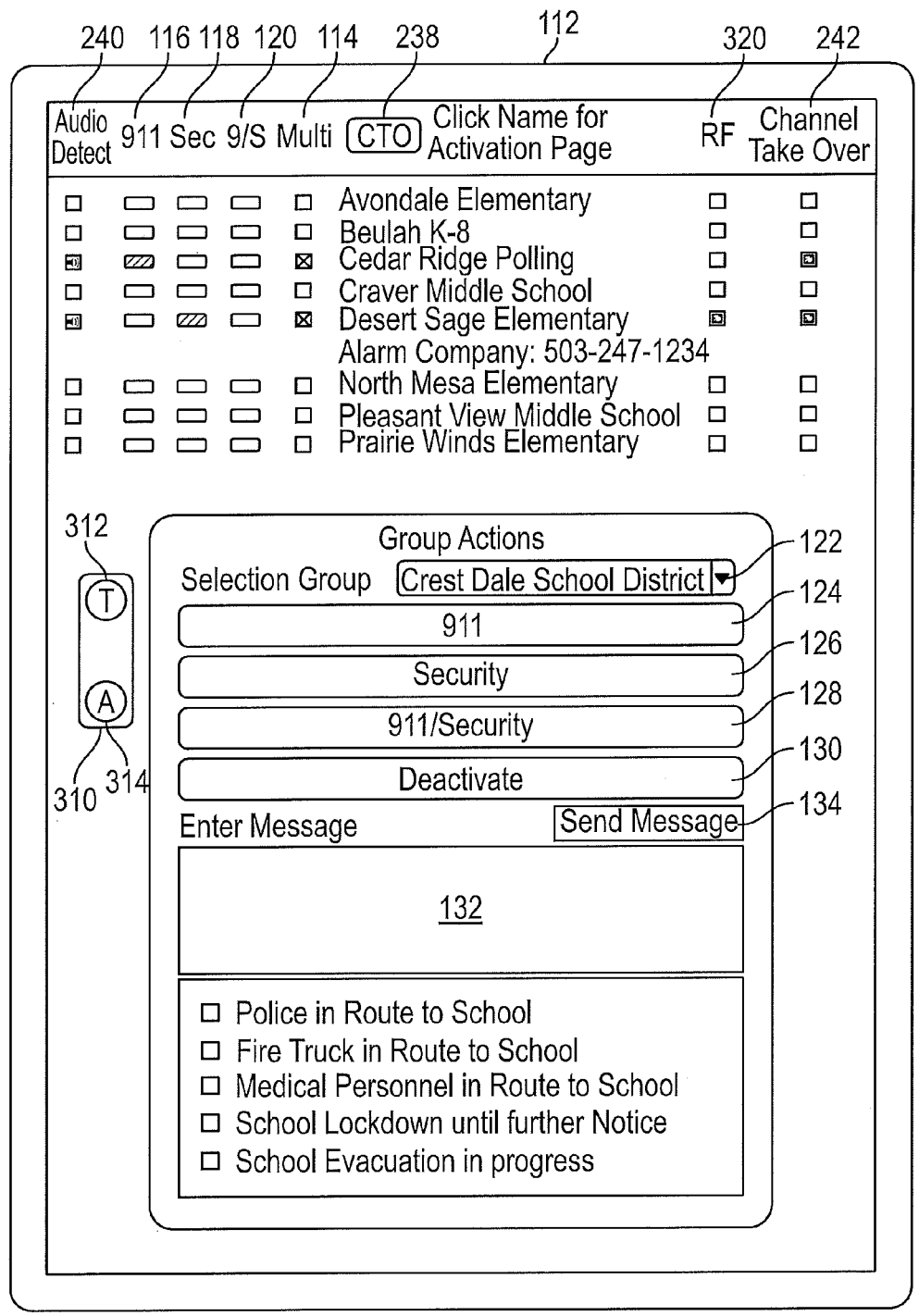
FIG. 23 is another user interface screen displaying functionality associated with control of the system by the redundant two-way digital radio network.

Referring to FIG. 23, additional functionality is shown with respect to a user display or user interface with respect to the redundant RF communication capability. Specifically, a digital radio control indicator 314 provides an indication within the user display showing whether a remote digital RF activation has occurred. There are two types of digital radio activations that are illustrated, namely, a first digital radio designation 312 denoted by the letter T and a second digital radio designation 314 denoted by the letter A. The T designation 312 corresponds, for example, to a private DMR network such as used within an organization such as a school district or business. The A designation 314 corresponds, for example, to a DMR public safety network used by emergency responders. If the "T" designation 312 is highlighted or illuminated in the user screen, this indicates that some aspect of control has been activated by an authorized radio within the private DMR network and similarly, if the "A" designation is illuminated, this indicates control has been activated by an authorized radio within the public safety DMR network.

Also shown in FIG. 23 is a status column 320 to indicate whether any digital radio control has been executed for any of the pre-programmed digital radios in either DMR network. As shown, there has been an activation of the bridge for the Desert Sage Elementary communication endpoint in which the corresponding box in the column is filled in or highlighted. Accordingly, an authorized digital radio transmitted a digital message received by the controller at that communication endpoint in which the radio bridge was then activated solely by the received digital RF signal. The user display is updated to immediately show a status of the bridge in which the received digital RF signal is shown as active or executed. This location also shows an active status for Channel Take Over and Audio Detect functions, as mentioned with respect to the prior embodiments.

Another control feature that may be provided by use of the preprogrammed digital radios includes digital commands for controlling a physical security feature at a selected communication endpoint. For example, in addition to executing connection of a radio bridge or to knock down a radio bridge, another command could be used to activate a PA system at the communication endpoint. Another example is a command that can be used to activate lights or to activate remote locking or unlocking of entry points to the facility.

Each authorized preprogrammed digital radio may have numerous preprogrammed functions that can be executed by a radio user by simply depressing one or more of the control buttons on the radio. As mentioned, use of theses types of digital RF signals are not affected by an IP network which may be slow to react, especially during extended emergency situations.

By providing a redundant capability to conduct system control through digital radios operating on a DMR protocol, reliability of the system is enhanced to ensure that timely decisions can be made to selectively execute bridging functions, as well as to execute immediate control over external physical security systems at a communication endpoint.

By providing a redundant capability to conduct system control through digital radios on a separate digital RF communications protocol, reliability of the system is enhanced to ensure that timely decisions can be made to selectively execute bridging functions, as well as to execute immediate control over external physical security systems at a communication endpoint.

By the foregoing, a method and system are provided for enhancing communications between emergency responders and personnel located at the communication endpoints. The communication bridge or patch may be selectively enabled or disabled. The communication brides between the endpoints, the 911 Call Center and emergency responders is achieved by commands issued over the Internet/Worldwide Web, and the number of communication endpoints can be easily tailored or modified by a sensor that manages communications between locations having their unique IP addresses. Organizations like schools may still maintain their local radio equipment, but have the capability to directly communicate with emergency responders on an as needed basis. Accordingly, organizations like schools maintain a public radio system capability, but without the great cost associated with such systems. The advanced digital interpreters also have other capabilities that not only enable or disable the capability of local radios to communicate with public safety radios, but also to control the specific manner in which the various local radios may communicate, such as by providing patch capability only to selected radios in the local radio set.

School personnel may carry hand-held UHF radios for normal communications within the school building. These portable radios are typically capable of being programmed to add additional UHF frequencies to minimize interference and to expand their capability to be used with public safety radios. During initial setup for each location to be a communication endpoint, each of the local radios are evaluated and programmed so they are capable of being bridged with the public safety radios. At the district level, VHF hand-held radios are preferred. In the event the local area network for the school district is down at a time when radio bridging is required, then the manual switch 46 on the local control panel may be used.

The ADI may utilize digital audio links between any band radio systems in either one channel or two channel modes. The bridge activation and deactivation is via web-based, graphical user interface screens, secured with log-on and network security measures. The system software can be configured as standard web-based applications. The server may utilize, for example, a Fedora Linux operating system. The three basic views in the user screens as discussed include a district activation view, a school activation view, and a notification view. The district view allows a district-wide list and status of bridging activations and alerts. The notification view only allows the user to view the status of designated bridging and alerts. The system administrator can manage the installed sites, licenses, users, and notification lists. The ADI has the intelligence to complete the radio links, report status, and process audio. The antennae systems for the radio units at the specific school locations are included to complete the radio signal link between the dissimilar radio networks. Backup power is provided at each location by an As disclosed, the ADI/processor can be a stand-alone unit integrated at each location to facilitate the bridge between the local radio users at that location and the public safety first responders. A command sent by the activating party in the form of IP packets over one or more communication networks is received by the ADI/processor, the command is recognized by the ADI as an instruction to either make the bridge or to knock down the bridge at that designated communication endpoint, and then the ADI facilitates the commanded bridging function. The radiating antennas at the user locations provide wireless links to the radio users at the location and the first responders. The public safety radio system often uses a radio tower or a collection of towers to provide links to their users, such as first responders which exchange dispatch voice messages with the 911 Call Center. The school district may have its own local area network with suitable network equipment, such as routers or switches. This local area network is connected to other local area networks via the Internet/Worldwide Web. The 911 Call Center and emergency responders may operate on their own local area network and which also communicate with the local area network school districts through a network transport or Internet connection. When the software associated with the invention is configured on terminals at each communication endpoint, users at those locations can operate the system in accordance with the privileges associated with the site software installation. As also discussed, the software installations at the various communication endpoints provide the proper indications and activation options enabling users to operate the system or to monitor the system. The software and the status and activation commands are configured and monitored by the network server. The number of communication endpoints, radios, and public safety communication endpoints is virtually unlimited in the present invention since radio bridging is web based. So long as each of the communication endpoints have their own IP addresses, the appropriate software can be installed at those locations to enable the communication bridges to be established between selected communicants, as established by an administrator of the system. As also mentioned, the server has the ability to manage e-mail or text messages to other networks in which activation has been achieved for selected communication endpoints. It is also contemplated that the server can be programmed to provide other services such as VOIP communications. Periodic testing can be conducted at the local control panels in order to ensure that the system is operating correctly at that location. Additional activation buttons/controls may be provided on the panels in order to accomplish these tests. These tests could also be processed at any operator terminal, to include testing of the integrity of the software to ensure the system as set up by the administrator is properly functioning.

While a system and method of the present invention have been set forth above with respect to a particular preferred embodiment, it shall be understood that various other modifications and changes may be made to the invention in accordance with the scope of the claims appended hereto.

What is claimed is:

1. A communication system especially adapted for facilitating emergency communications between communicants having respective radio systems, said system comprising:
   a computer processor located at a first communication endpoint;
   a communication server for managing communications between the first communication endpoint and a second communication endpoint;
   an Internet Protocol (IP) communications network for interconnecting said communications server and said computer processor, said server and said computer processor having respective IP addresses;
   at least one public safety radio associated with one of said communication endpoints;
   at least one local radio associated with the other of said communication endpoints;
   at least one pre-programmed digital radio associated with said communication endpoints and operating on a different channel or frequency than said at least one public safety radio and said at least one local radio;
   a radio bridge for facilitating direct radio communications between said at least one public safety radio and said local radio, said radio bridge including hardware enabling connection between the radios, said bridge communicating with said server to receive activation and deactivation instructions sent from an authorized user, said instructions being sent as IP packets over the communications network;
   a digital radio module incorporated with said radio bridge, said module providing a capability to control said radio bridge by an Radio Frequency (RF) signal received from said at least one pre-programmed digital radio;
   computer coded instructions associated with said server and said computer processor to selectively control and monitor the system to include (i) activation and deactivation of said radio bridge as controlled by said first computer and to prevent activation and deactivation control at said communication endpoint associated with the at least one local radio, and (ii) to produce visual displays on respective user interfaces of said first and second computers; and
   wherein said visual displays include an indication of whether a radio bridge has been activated or deactivated by said at least one pre-programmed digital radio.

2. A communication system, as claimed in claim 1, wherein:
   said indication of activation or deactivation by said at least one pre-programmed digital radio includes an indication of whether the radio is a public safety digital radio or a private digital radio.

3. A communication system, as claimed in claim 1, wherein:
   said indication of activation or deactivation by said at least one pre-programmed digital radio includes an indication of which communication endpoint is connected by said bridge or disconnected from said bridge.

4. A communication system, as claimed in claim 1, wherein:
   said digital radio module further includes a capability to control at least one function at a selected communication endpoint by an RF signal received from said at least one pre-programmed digital radio, said function including execution of control of a Public Address (PA) system at the communication endpoint to broadcast situational awareness messages over said PA system.

5. A method of communicating radio transmissions between communicants having respective radios, said method comprising:
provide a radio bridge for facilitating radio communications between at least one public safety radio and a local radio, said radio bridge including hardware enabling connection between the radios, said bridge communicating with a communications server to receive activation and deactivation instructions sent from an authorized user, said instructions being sent as Internet Protocol (IP) packets over a communications network of which said public safety radio and local radio are incorporated in;
providing a digital radio module incorporated with said radio bridge, said module providing a capability to alternatively control said radio bridge by an Radio Frequency (RF) signal received from said at least one pre-programmed digital radio that operates on a different channel or frequency than said at least one local radio;
providing computer coded instructions associated with said communications server to selectively control and monitor communications including activation and deactivation of said radio bridge, and to prevent activation and deactivation control at a location associated with said local radio or said at least one pre-programmed digital radio; and
generating an indication on a user interface of said radio bridge showing activation or deactivation of said radio bridge by said local radio or said at least one pre-programmed digital radio as associated with one or more communication endpoints.

6. A method, as claimed in claim 5, wherein:
said indication of activation or deactivation by said at least one pre-programmed digital radio includes an indication of whether the radio is a public safety digital radio or a private digital radio.

7. A method, as claimed in claim 6, wherein:
said indication of activation or deactivation by said at least one pre-programmed digital radio includes an indication of which communication endpoint is connected by said bridge or disconnected from said bridge.

8. A method, as claimed in claim 6, wherein:
said digital radio module further includes control of at least one function at a selected communication endpoint by an RF signal received from said at least one pre-programmed digital radio, said function including execution of control of a Public Address (PA) system at the selected communication endpoint to broadcast situational awareness messages over said PA system.

9. A communication system especially adapted for facilitating emergency communications between communicants having respective radio systems, said system comprising:
at least one pre-programmed digital radio;
a radio bridge for facilitating direct radio communications between at least one public safety radio associated with one communication endpoint and a local radio associated with another communication endpoint, said at least one pre-programmed digital radio operating on a different channel than said at least one local radio;
said bridge further including a processor that communicates with a communications server to receive activation and deactivation instructions sent from an authorized user, said instructions being sent as Internet Protocol (IP) packets over a communications network for interconnecting said communications server and at least one computer processor, said communication server and said at least one computer processor having respective IP addresses;
a digital radio module incorporated with radio bridge, said module providing controlled activation and deactivation of said radio bridge by an RF signal received from said at least one pre-programmed digital radio;
computer coded instructions associated with said server to selectively control and monitor the system to include (i) activation and deactivation of said radio bridge, and (ii) to produce visual displays on respective user interfaces of said first and second computers; and
wherein said visual displays include an activation or status screen showing a status of one or more selected communication endpoints and whether said endpoints have a radio bridge activated by an IP network associated with the system, an Radio Frequency (RF) network associated with said pre-programmed digital radio, or both said IP network or said RF network.

10. A communication system, as claimed in claim 9, wherein:
said visual displays further include an indication of activation or deactivation by said at least one pre-programmed digital radio, and further includes an indication of whether the radio is a public safety digital radio or a private digital radio.

11. A communication system, as claimed in claim 10 wherein:
said visual displays include an indication of activation or deactivation by said at least one pre-programmed digital radio as corresponding to which communication endpoint is connected by said bridge or disconnected from said bridge.

12. A communication system, as claimed in claim 10, wherein:
said digital radio module further includes control of at least one function at a selected communication endpoint by an RF signal received from said at least one pre-programmed digital radio, said function including execution of control of a Public Address (PA) system at the communication endpoint to broadcast situational awareness messages over said PA system.

13. A communication system especially adapted for facilitating emergency communications between communicants having respective radio systems, said system comprising:
a communication server for managing communications between communication endpoints within a communications network, said network interconnecting said communications server and at least one computer processor located at a respective communication endpoint, said server and said at least one computer processor having respective Internet Protocol (IP) addresses;
a radio bridge for facilitating radio communications between at least one public safety radio associated with a communication endpoint and at least one local radio associated with another communication endpoint, said bridge further including a processor that communicates with said communications server to receive activation and deactivation instructions sent from an authorized user, said instructions being sent as IP packets over the communications network;
computer instructions to selectively control and monitor the system to include (i) activation and deactivation of said radio bridge as controlled by said at least one computer processor and to prevent activation and deactivation control at a selected communication endpoint associated with the at least one local radio, and (ii) to produce visual displays on a user interface of said at least one computer processor; and wherein said visual displays include an activation or status screen showing an audio detect feature indicative of which communication endpoints are transmitting radio communications.

14. A communication system, as claimed in claim 13, further including:
data displayed corresponding to recorded radio transmissions of said system, said recorded radio transmissions being associated with at least one of: a 911 activation, a security activation, or a channel take over occurrence.

15. A communication system, as claimed in claim 14, wherein the displayed data further includes an indication of each recorded radio transmission and a relative time period over which each recorded radio transmission took place.

16. A communication system, as claimed in claim 14, wherein the displayed data further includes a chronologically aligned display of selected 911 activations, selected security activations, or selected channel take over occurrences as they took place over a selected time period for a selected communication endpoint.

17. A communication system, as claimed in claim 14, wherein:
said displayed data comprises a situational awareness tracker for determining an extent to which selected personnel located at a communication endpoint demonstrate proficiency.

18. A method of communicating radio transmissions between communicants having respective radios, said method comprising:
providing a radio bridge for facilitating radio communications between at least one public safety radio and a local radio, said bridge including a computer processor that communicates with a communications server to receive activation and deactivation instructions sent from an authorized user, said instructions being sent as Internet Protocol (IP) packets over a communications network of which said public safety radio and local radio are incorporated in;
providing computer instructions associated with said computer processor to selectively control and monitor communications including activation and deactivation of said radio bridge, and to prevent activation and deactivation control at a location associated with said at least one local radio; and
generating an indication on a user interface of said radio bridge showing an audio detect feature, said audio detect feature indicating which communication endpoints are transmitting radio communications.

19. A method, as claimed in claim 18, further including:
data displayed corresponding to recorded radio transmissions of said system, said recorded radio transmissions being associated with at least one of: a 911 activation, a security activation, or a channel take over occurrence.

20. A communication system especially adapted for facilitating emergency communications between communicants having respective radio systems, said system comprising:
first and second computer processors located at respective communication endpoints;
a radio bridge for facilitating direct radio communications between at least one public safety radio and a local radio associated, said bridge further including a processor that communicates with a communications server that manages communications between the communication endpoints and to receive activation and deactivation instructions sent from an authorized user, said instructions being sent as Internet Protocol (IP) packets over a communications network that interconnects said communications server and said computer processors, said server and each of said computer processors having respective IP addresses;
computer instructions to selectively control and monitor the system to include (i) activation and deactivation of said radio bridge as controlled by said first computer and to prevent activation and deactivation control at said communication endpoint associated with the at least one local radio, and (ii) to produce visual displays on at least one user interface for said first or second computers; and
wherein said visual displays include an activation or status screen showing a channel take over feature, said channel take over feature indicating whether an authorized user has interrupted the ability of radio transmissions at a selected endpoint location.

21. A communication system, as claimed in claim 20, further including:
data displayed corresponding to recorded radio transmissions of said system, said recorded radio transmissions being associated with at least one of: a 911 activation, a security activation, or a channel take over occurrence.

22. A communication system as claimed in claim 20, wherein:
said channel take over feature further includes activating and deactivating the radio bridge by manipulation of one or more icons on a user interface associated with said computer processor.

23. A communication system, as claimed in claim 21, wherein the displayed data further includes an indication of each recorded radio transmission and a relative time period over which each recorded radio transmission took place.

24. A communication system, as claimed in claim 21, wherein the displayed data further includes a chronologically aligned display of selected 911 activations, selected security activations, or selected channel take over occurrences as they took place over a selected time period for a selected communication endpoint.

25. A communication system, as claimed in claim 21, wherein: said displayed data comprises a situational awareness tracker for determining an extent to which selected personnel at a communication endpoint demonstrate proficiency.

* * * * *